(12) United States Patent
Pyhälammi et al.

(10) Patent No.: US 7,464,110 B2
(45) Date of Patent: Dec. 9, 2008

(54) AUTOMATED GROUPING OF IMAGE AND OTHER USER DATA

(75) Inventors: Seppo Pyhälammi, Helsinki (FI); Kai Häggman, Espoo (FI); Jouni Soitinaho, Espoo (FI); Tuomo Sihvola, Espoo (FI)

(73) Assignee: Nokia Corporation, Espoo (FI)

( * ) Notice: Subject to any disclaimer, the term of this patent is extended or adjusted under 35 U.S.C. 154(b) by 887 days.

(21) Appl. No.: 10/879,161

(22) Filed: Jun. 30, 2004

(65) Prior Publication Data

US 2006/0004685 A1    Jan. 5, 2006

(51) Int. Cl.
  *G06F 17/00*    (2006.01)
(52) U.S. Cl. .................... 707/104.1; 707/101; 707/102; 707/103 R
(58) Field of Classification Search ............... 707/1–10, 707/100–104.1, 200–206
  See application file for complete search history.

(56) References Cited

U.S. PATENT DOCUMENTS

| | | | |
|---|---|---|---|
| 5,038,401 A | 8/1991 | Inotsume | |
| 5,410,326 A | 4/1995 | Goldstein | |
| 5,537,528 A | 7/1996 | Takahashi et al. | |
| 5,598,523 A | 1/1997 | Fujita | |
| 5,625,608 A | 4/1997 | Grewe et al. | |
| 5,802,361 A | 9/1998 | Wang et al. | |
| 5,946,444 A | 8/1999 | Evans et al. | |
| 6,130,726 A | 10/2000 | Darbee et al. | |
| 6,240,414 B1 * | 5/2001 | Beizer et al. ................... | 707/8 |
| 6,278,499 B1 | 8/2001 | Darbee et al. | |
| 6,286,003 B1 | 9/2001 | Muta | |
| 6,289,165 B1 | 9/2001 | Abecassis | |
| 6,437,836 B1 | 8/2002 | Huang et al. | |
| 6,476,825 B1 | 11/2002 | Croy et al. | |
| 6,532,592 B1 | 3/2003 | Shintani et al. | |
| 6,684,087 B1 | 1/2004 | Yu et al. | |
| 6,701,525 B1 | 3/2004 | Neervoort et al. | |
| 6,728,753 B1 | 4/2004 | Parasnis et al. | |
| 6,741,864 B2 | 5/2004 | Wilcock et al. | |

(Continued)

FOREIGN PATENT DOCUMENTS

CN    1501243    6/2004

(Continued)

OTHER PUBLICATIONS

Pyhälammi, Seppo, U.S. Appl. No. 10/307,410, filed Dec. 2, 2002.

(Continued)

*Primary Examiner*—Isaac M Woo
(74) *Attorney, Agent, or Firm*—Banner & Witcoff, Ltd.

(57) ABSTRACT

A user selects a data file (e.g., an image file) from an interface (e.g., a thumbnail view). Upon selecting a file from the interface, the contents of that file are presented to the user in an appropriate manner (e.g., providing an enlarged image display). The selected file is also moved to a separate folder. As the contents of additional files are presented to the user, those files are also moved to the separate folder. A new folder is created when the user returns to the interface and selects another file from that interface, or alternatively, upon instruction from the user to create a new folder. The user may then rename or otherwise modify the folder(s).

50 Claims, 19 Drawing Sheets

U.S. PATENT DOCUMENTS

| | | | |
|---|---|---|---|
| 6,793,352 B2 | 9/2004 | Karasawa et al. |
| 6,804,684 B2 | 10/2004 | Stubler et al. |
| 6,832,102 B2 | 12/2004 | Ekel et al. |
| 6,914,626 B2 | 7/2005 | Squibbs |
| 6,918,136 B2 | 7/2005 | Sheperd |
| 6,950,989 B2 | 9/2005 | Rosenzweig et al. |
| 6,954,543 B2 | 10/2005 | Svendsen et al. |
| 6,978,424 B2 | 12/2005 | Safadi |
| 6,981,223 B2 | 12/2005 | Becker et al. |
| 6,992,710 B2 | 1/2006 | Nagaoka |
| 7,010,144 B1 | 3/2006 | Davis et al. |
| 7,050,097 B2 | 5/2006 | Schick et al. |
| 7,079,113 B1 | 7/2006 | Hayes et al. |
| 7,109,974 B2 | 9/2006 | Kempisty |
| 7,155,305 B2 | 12/2006 | Hayes et al. |
| 7,165,224 B2 | 1/2007 | Pyhalammi |
| 7,206,806 B2 | 4/2007 | Pineau |
| 7,266,563 B2 | 9/2007 | Morris et al. |
| 7,269,843 B2 | 9/2007 | Yamaguchi et al. |
| 7,271,734 B2 | 9/2007 | Sata et al. |
| 2002/0002707 A1 | 1/2002 | Ekel et al. |
| 2002/0103881 A1 | 8/2002 | Granade et al. |
| 2002/0151327 A1 | 10/2002 | Levitt |
| 2002/0178279 A1 | 11/2002 | Janik et al. |
| 2003/0033296 A1 | 2/2003 | Rothmuller et al. |
| 2003/0037341 A1 | 2/2003 | Van Der Meulen |
| 2003/0081145 A1 | 5/2003 | Seaman et al. |
| 2003/0093469 A1 | 5/2003 | Ohta et al. |
| 2003/0117427 A1 | 6/2003 | Haughawout et al. |
| 2003/0140343 A1 | 7/2003 | Falvo et al. |
| 2003/0145089 A1 | 7/2003 | Edwards et al. |
| 2003/0200268 A1 | 10/2003 | Morris |
| 2003/0208453 A1 | 11/2003 | Enete et al. |
| 2004/0004663 A1 | 1/2004 | Kahn et al. |
| 2004/0054757 A1 | 3/2004 | Ueda et al. |
| 2004/0075777 A1 | 4/2004 | Lee |
| 2004/0109013 A1 | 6/2004 | Goertz |
| 2004/0137935 A1 | 7/2004 | Zarom |
| 2004/0165006 A1 | 8/2004 | Kirby et al. |
| 2004/0259537 A1 | 12/2004 | Ackley |
| 2004/0260680 A1 | 12/2004 | Best et al. |
| 2005/0039133 A1 | 2/2005 | Wells et al. |
| 2005/0055347 A9 | 3/2005 | Cho et al. |
| 2005/0120050 A1 | 6/2005 | Myka et al. |
| 2005/0155070 A1 | 7/2005 | Slaughter |
| 2005/0165726 A1 | 7/2005 | Kawell et al. |
| 2006/0090122 A1 | 4/2006 | Pyhalammi et al. |
| 2006/0161635 A1 | 7/2006 | Lamkin et al. |

FOREIGN PATENT DOCUMENTS

| | | |
|---|---|---|
| EP | 0115038 | 8/1984 |
| EP | 1107209 A1 | 6/2001 |
| EP | 1150215 | 10/2001 |
| EP | 1087307 | 3/2003 |
| GB | 2379116 A | 2/2003 |
| WO | 01/037260 | 5/2001 |
| WO | 0180084 | 10/2001 |
| WO | WO 02/085004 A1 | 10/2002 |
| WO | 2003047172 | 6/2003 |
| WO | WO-03/047172 | 6/2003 |
| WO | 03088027 | 10/2003 |
| WO | 2004025952 | 3/2004 |
| WO | 2004044737 | 5/2004 |

OTHER PUBLICATIONS

Pyhälammi, Seppo, U.S. Appl. No. 10/262,969, filed Oct. 3, 2002.
A Pyhälammi, Seppo and Mäki Jussi, U.S. Appl. No. 10/263,193, filed Oct. 3, 2002.
Pyhälammi, Seppo, U.S. Appl. No. 10/452,880, filed Jun. 3, 2003.
Kirkeby, Ole and Pyhälammi, Seppo, U.S. Appl. No. 10/417,230, filed Apr. 17, 2003.
International Search Report for PCT/IB2005/002070 mailed Dec. 1, 2005.
XP002387470, IrfanView, pp. 1-4, copyright 1999 by S. E. Clark.
Office Action for European Application No. 05759410.3 mailed Apr. 22, 2008, 6 pages.
First Office Action from The Patent Office of the People's Republic of China for Application No. 2005800265590, mailed Jun. 13, 2008.

* cited by examiner

AUTOMATED GROUPING OF IMAGE AND OTHER USER DATA

CROSS-REFERENCE TO RELATED APPLICATIONS

This application is related to commonly-owned U.S. patent application Ser. No. 10/879,132, titled "AUTOMATED PRIORITIZATION OF USER DATA FILES" and filed simultaneously herewith.

FIELD OF THE INVENTION

The present invention relates generally to organizing, maintaining and accessing electronic data. More particularly, the invention concerns organizing, accessing and maintaining electronic image and other user data so as to provide a more convenient way to browse, search and view electronically stored pictures and other types of information.

BACKGROUND OF THE INVENTION

Digital cameras and other devices for digital imaging, video recording and audio recording have become commonplace. For example, many wireless telephones and other mobile devices also create digital photographs, video segments and audio segments. The increasing ease with which users can create and store digital images creates challenges, however. Unlike conventional photography, where costs of film and developing tend to limit the number photographs created on a given occasion, electronic imaging encourages users to create a larger number of images. Because there are no film or developing costs involved, it is easier to generate multiple images and discard those that may be unsatisfactory. However, this advantage often comes at the cost of having to review and organize a much larger number of images. As more and more images accumulate, it becomes more and more difficult for a user to organize the images, as well as to find a particular stored image.

In many cases, numerous images are often related in some way, and are more valuable if grouped based on that relationship. For example, a user may wish to group images taken on a particular occasion (e.g., a wedding, a family gathering, a holiday), over a particular time period (e.g., a vacation), of a particular subject (e.g., pictures of a particular person), or in some other way. Organizing images into desired groupings can be a laborious and tedious process, however. In some cases, this task is somewhat relieved by arraying smaller versions of numerous images (or "thumbnails") on a display screen. By seeing multiple images at once, the user is better able to sort through those images. However, thumbnail images are typically low resolution and not useful for seeing finer details. It is sometimes difficult to evaluate image quality from a thumbnail. A user sorting through numerous image files is thus often required to browse through numerous thumbnails, to enlarge images which are potential candidates for a particular grouping, and to then separately save each image into the desired group. Organizing images in this manner requires a user to perform a number of separate steps for each image.

For these and other reasons, there remains a need for systems and methods by which a user can more conveniently organize images and other types of user data.

SUMMARY OF THE INVENTION

Aspects of the present invention are directed to allowing a user to organize data for electronic images and other types of information stored in a server coupled to a display such as a television set and having interfaces with one or more communication networks. A user is initially provided with an interface in which he or she can select one of multiple data files. In some embodiments, the data files are image files for electronically created images, and the interface is a view of thumbnail images corresponding to those files. Upon selecting a file from the interface, the contents of that file are presented to the user in an appropriate manner, e.g., providing an enlarged image display, playing an audio clip, playing a video clip, etc. The selected file is also automatically moved to a separate folder. As the contents of additional files are presented to the user, those files are also automatically moved to the separate folder. A new folder is created when the user returns to the interface and selects another file from that interface, or alternatively, upon instruction from the user to create a new folder. The user may then rename or otherwise modify the folders.

In a first embodiment, the invention includes a method for organizing user data files containing at least one of an audio recording and an electronic image. The method includes storing a plurality of user data files in a first folder in a memory and displaying a file selection user interface presenting information about each of the plurality of files. Selection of a user data file from that interface generates a presentation of the selected file, with the presentation including at least one of an audio playback and a visual display of the selected file contents. The method also includes receiving a selection of a first file of the plurality from the file selection user interface, creating a second folder within the memory and automatically storing the first file in the second folder in response to the selection. A user instruction to present a second file of the plurality is received, and the second file is automatically stored in the second folder in response to that instruction. A second embodiment includes a machine-readable medium having instructions for performing a method similar to that of the first embodiment. A third embodiment includes a server having a processor configured to perform steps similar to those of the first embodiment.

These and other features of the invention will be apparent upon consideration of the following detailed description of preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE PREFERRED EMBODIMENTS

Figure 1:
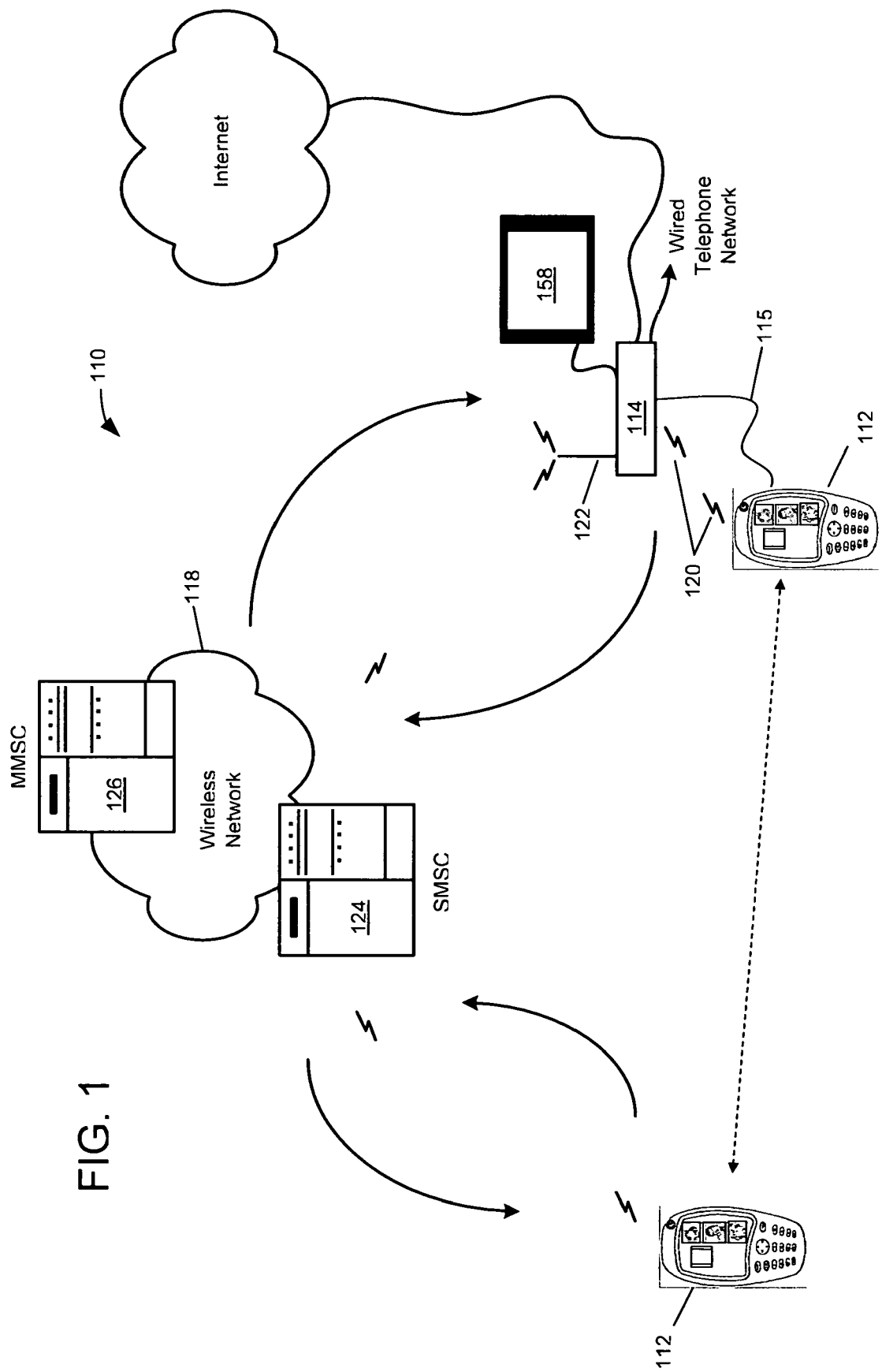
FIG. 1 is a block diagram of an example of a wireless communication system in which various aspects of the present invention may be implemented.

FIG. 1 shows an example of a wireless communication system 110 in which the systems and methods of the present invention may be advantageously employed. One or more network-enabled remote control or mobile devices 112, such as a personal digital assistant (PDA), digital camera, cellular phone, mobile terminal, or combinations thereof, is in communication with a server 114. Although not shown in FIG. 1, server 114 may act as a file server, such as a personal server or personal storage device, for a network such as a home network, some other Local Area Network (LAN), or a Wide Area Network (WAN). Server 114 may be a computer or other device capable of storing and accessing data, such as a laptop, set-top box, digital video disc (DVD), television, personal video recorder (PVR), digital video recorder (DVR), TiVo compatible device, personal portable server, personal portable media player, network server, and/or other device capable of storing and accessing data. Mobile device 112 may communicate with server 114 in a variety of manners. For example, mobile device 112 may communicate with server 114 via wireless network 118. Wireless network 118 may be a third-generation (3 G) cellular data communications network, a Global System for Mobile communications network (GSM), or other wireless communication network. Remote control or mobile device 112 may also have one or more ports allowing a wired connection to server 114 via, e.g., universal serial bus (USB) cable 115. Mobile device 112 may also be capable of short-range wireless connection 120 (e.g., a BLUETOOTH, WLAN, WiFi or IrDA link) to server 114. A single mobile device 112 may be able to communicate with server 114 in multiple manners. Although not shown in FIG. 1, in accordance with at least one embodiment of the present invention, mobile device 112 may include server 114 within the same physical housing as mobile device 112. It should be understood by those skilled in the art that the present invention is not so limited to a server 114 that physically resides external to mobile device 112.

Server 114 may act as a repository for storing files received from mobile device 112 and/or from other sources. Server 114 may have, or be coupled to, a wireless interface 122 configured to transmit and/or receive communications (such as messages, files, or other data) with mobile network 118 or WLAN network. Server 114 may alternatively (or also) have one or more other communication network connections. For example, server 114 may be linked (directly or via one or more intermediate networks) to the Internet, to a conventional wired telephone system, or to some other communication or broadcasting network, such as a TV, a radio or IP datacasting networks.

In one embodiment, mobile device 112 has a wireless interface configured to send and/or receive digital wireless communications within wireless network 118. As part of wireless network 118, one or more base stations (not shown) may support digital communications with mobile device 112 while the mobile device is located within the administrative domain of wireless network 118. The base station of wireless network 118 that is in communication with mobile device 112 may be the same or a different base station that is in communication with server 114. Indeed, mobile device 112 and server 114 may each be in communication with different wireless networks (e.g., mobile device 112 could be roaming), which could in turn be interlinked via one or more intermediate wired or wireless networks. For simplicity, server 114 and mobile device 112 are shown within the same wireless network 118.

Mobile device 112 communicates with server 114 via wireless network 118 and is configured to transmit user data files for remote storage on server 114. As used herein, "user data" refers to information stored in a "user data file." As previously discussed, a "user data file" includes, but is not limited to, video files (e.g., MPEG and other file types), audio files (e.g., MP3, MIDI, WAV and other file types), text files, message files (e.g., SMS and MMS messages), e-mails, HTML files, presentations, etc. Mobile device 112 may also be configured to access data previously stored on server 114. In one embodiment, data file transfers between mobile device 112 and server 114 may occur via Short Message Service (SMS) messages and/or Multimedia Messaging Service (MMS) messages transmitted via short message service center (SMSC) 124 and/or a multimedia messaging service center (MMSC) 126. Although shown as part of network 118, SMSC 124 and MMSC 126 may be part of another network or otherwise outside of network 118. Although shown as separate logical entities, SMSC 124 and MMSC 126 could be a single entity. Further, SMSC 124 and MMSC 126 may coordinate via signaling between themselves for improving the file transfer process. For example, because SMSC 124 and MMSC 126 may be store-and-forward systems, rather than real-time systems, a file requested via an SMS message from mobile device 112 may still reside on MMSC 126 based upon a previous request. As such, SMSC 124 may copy MMSC 126 on an SMS file request and, if applicable, MMSC 126 may notify the user of the previously stored file. Further, MMSC 126 may simply transfer the requested file based on its stored copy of the file. In other embodiments, MMSC 126 may act as a repository for files, and mobile device 112 may simply request transfer of files from MMSC 126.

Figure 2:
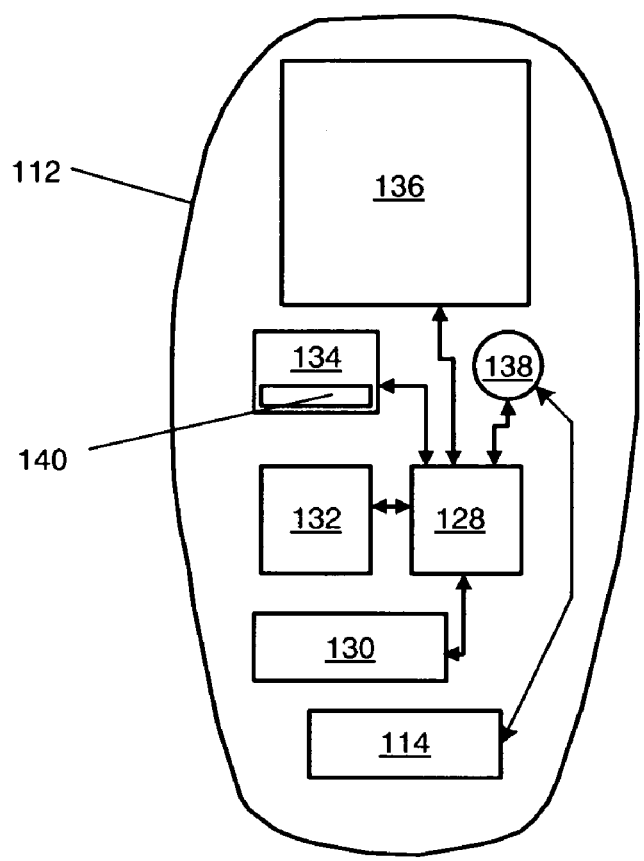
FIG. 2 is a block diagram of an illustrative mobile device according to at least one embodiment of the invention.

As shown in FIG. 2, mobile device 112 may include processor 128 connected to user interface 130, wireless communications interface 132, memory 134 and/or other storage, display 136, and digital camera 138. User interface 130 may further include a keypad, four arrow keys, joy-stick, data glove, mouse, roller ball, touch screen, voice interface, or the like. Software 140 may be stored within memory 134 and/or other storage to provide instructions to processor 128 for enabling mobile device 112 to perform various functions. For example, software 140 may configure processor 128 to enable mobile device 112 to take digital photographs via digital camera 138, to automatically name a photograph, to save photographs as image files, to transfer image files to server 114, to retrieve and display image files from server 114, and to browse the Internet using communications interface 132. Software 140 may further configure processor 128 to enable mobile device 112 to create, store, play, send and/or receive audio, video, text and/or other types of user data files. Audio files (or audio portions of video files) are displayed by playing the file contents on a speaker within mobile device 112 (not shown) or on headphones (also not shown). Although not shown, communications interface 132 could include additional wired (e.g., USB) and/or wireless (e.g., BLUETOOTH, WLAN, WiFi or IrDA) interfaces configured to communicate over different communication links. In accordance with at least one embodiment, mobile device 112 may include server 114.

Figure 3:
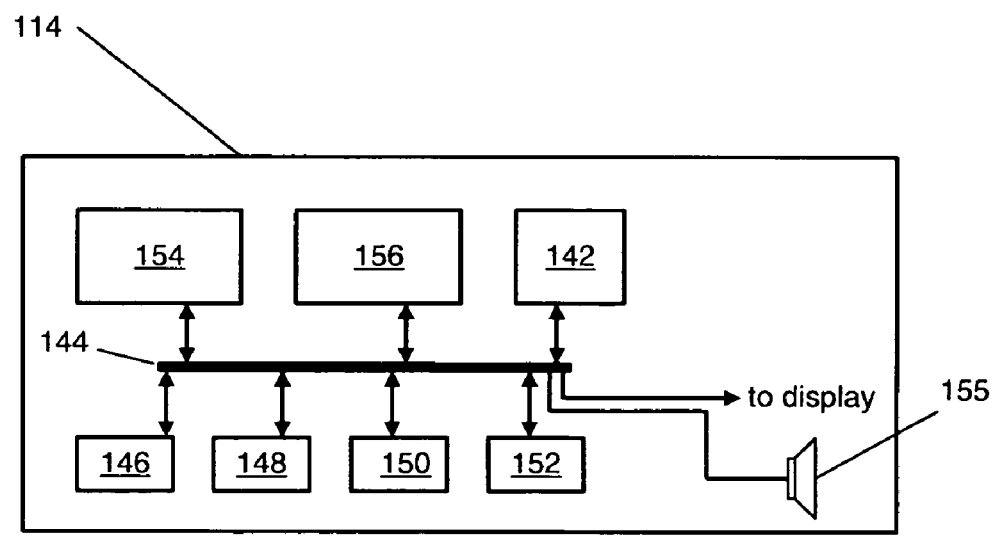
FIG. 3 is a block diagram of a server according to at least one embodiment of the invention.

As shown in FIG. 3, server 114 may include processor 142 coupled via bus 144 to one or more communications interfaces 146, 148, 150 and 152. Interface 146 may be a cellular telephone or other wireless network communications interface. There may be multiple different wireless network communication interfaces. Interface 148 may be a conventional wired telephone system interface. Interface 150 may be a cable modem. Interface 152 may be a BLUETOOTH interface or any other short range wireless connection interface. Additionally, there may be multiple different interfaces. Server 114 may also include volatile memory 154 (e.g., RAM) and/or non-volatile memory 156 (such as a hard disk drive, tape system, or the like). Software and applications may be stored within memory 154 and/or memory 156 that provides instructions to processor 142 for enabling server 114 to perform various functions, such as processing file transfer requests (such as for image files), storing files in memory 154 or memory 156, displaying images and other data, and organizing images and other data. The other data may e.g. video files, audio files, emails, SMS/MMS messages, other message files, text files, presentations, etc. Although shown as part of server 114, memory 156 could be remote storage coupled to server 114, such as an external drive or another storage device in communication with server 114. In some embodiment, server 114 may also include a rechargeable battery (not shown) for providing electricity for a portable server. Preferably, server 114 also includes or is coupled to a display device 158, such as a television (TV) device, display on the mobile device 112, such as display 136, or a liquid crystal display (LCD) projector, shown in FIG. 1 via a video interface (not shown). Preferable, the display device may have a speaker. Display 158 may be a computer monitor, a television set, or other type of display device. In at least some embodiments, server 114 also includes a speaker 155 over which audio clips (or audio portions of video clips) stored in memory 154 or 156 may be played. In accordance with at least one embodiment, display device 158 may be display 136 on the mobile device 112. In some other embodiments the input device 112 and the display 158, or alternatively the input device 112, the display device 158 and the server 114 may be combined in a same device unit, such as a mobile phone, a digital camera, digital audio device, etc.

A user accesses server 114 directly through a local input device, such as 112. Server 114 also displays various user interfaces (e.g., such as are described below) on display device 158 in addition to thumbnails, enlarged images, and other information. Possible input devices 112 include wired and wireless keyboards, mice and remote control units. Mobile device 112 could also function as a remote control unit and communicate with server 114 by BLUETOOTH or other wireless link, or via a cable connection to a port on mobile device 112. In some embodiments, server 114 is accessible remotely via mobile device 112 or (other devices) over wireless network 118, the Internet, or another communication network. St further, in accordance with at least one embodiment, server 114 may be included within mobile device 112.

According to one embodiment of the invention, a method is provided for organizing files stored on a device such as server 114. Although the following description refers to photographic image files received from one or more mobile devices 112, the invention is not limited by data type, file type or source. Other data or file types may be audio files, video files, message files, such as SMS or MMS, emails, text documents, and presentations. The files may originate from the device 112 itself or they may be received from other devices.

As images are created by mobile device 112, each image is stored as a data file in memory 134. Each image file is assigned a file name, and the files are ordered based on those names or based on the order in which the images are created. Additionally, some other metadata information, such as date, time, location, topic, etc. may included in the image files, and the image files may be ordered based on the metadata information. At some point, a user transfers those image files to server 114, where they are placed in storage memory 156. When initially transferred from mobile device 112 to server 114, image files are stored in the same order in which they were stored in memory 134 of mobile device 112.

Figure 4:
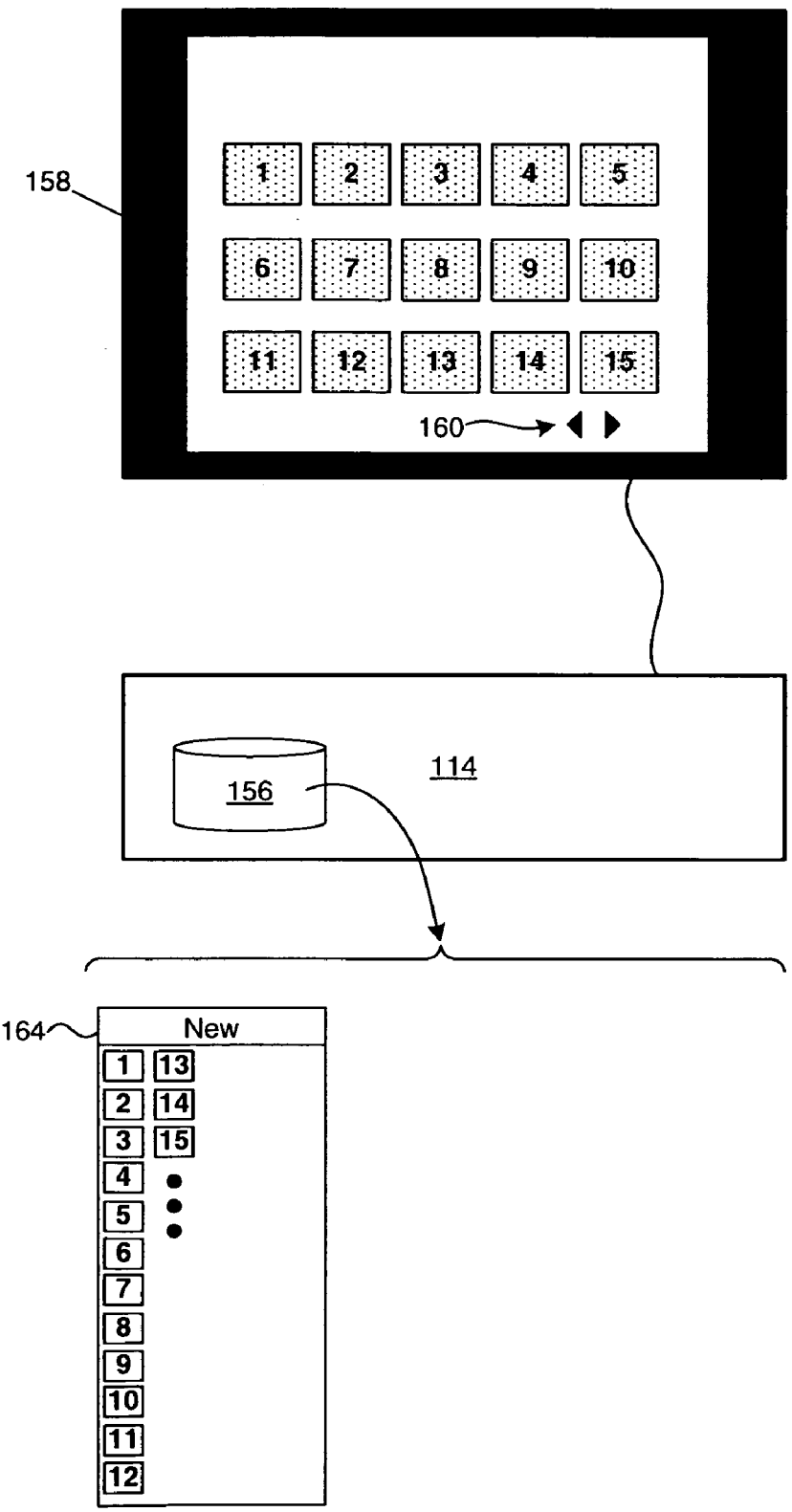
FIG. 4 shows, in partially schematic form, a thumbnail view of multiple images on a display and storage of corresponding image files.

At some later point, a user then accesses images stored within storage memory 156. In at least some embodiments, the user is able to view multiple image files simultaneously as thumbnail images in a thumbnail view user interface. Thumbnails may be presented for other kinds of data files, such as video files, text files, presentations, and messages. FIG. 4 shows, in partially schematic form, a thumbnail view interface on display 158. For simplicity, images are represented within the drawings as stippled and numbered boxes; an image file for a particular image is represented in the drawings as an unstippled box having the same number. As shown in FIG. 4, thumbnails of images 1 through 15 are arrayed on display 158. Additionally, thumbnails of images or files may be presented in a time-line manner, i.e. images or files related to specific periods or a moments of time are presented in own their specific groups, and the groups are presented in a time-line order, e.g. by date order. One or more groups in the time-line may be presented on the display at the same time. Corresponding image files (which may be in JPEG or other format) are stored in storage memory 156 in one or more file folders. For convenience, FIG. 4 shows image files 1 through 15 initially contained in a single folder 164 titled "New." Image files 1 through 15 may or may not be images created on a single occasion. For example, a user may transfer collections of image files from mobile device 112 to server 114 on several occasions before reviewing the corresponding images (whether in thumbnail form or otherwise) on display 158. In certain embodiments, server 114 stores images from each transfer in a separate folder (e.g., "New1," "New2," etc.). Within each of those folders, however, images will be ordered in the same manner as those images were ordered by mobile device 112 (e.g., chronologically).

Although FIG. 4 only shows fifteen images and corresponding image files, it will be appreciated that many more images and files will often be present. Accordingly, "page forward" and "page back" arrows 160 (or other appropriate interface) are provided in the thumbnail display so that the user may move forward (or backward) to additional screens of thumbnail images. The forward and backward arrows may also be used to scroll in a time line presentation to locate a specific image folder. If the image folder is unprocessed, it usually includes only time information, such as a period of time, as a title because users of digital cameras or digital video recorders often fail to add descriptive metadata information manually.

In another embodiment, a user is able to view multiple files simultaneously in a list, tree or root kind of structure and user interface. Thumbnails are not necessarily needed and they are not always applicable.

Figure 5:
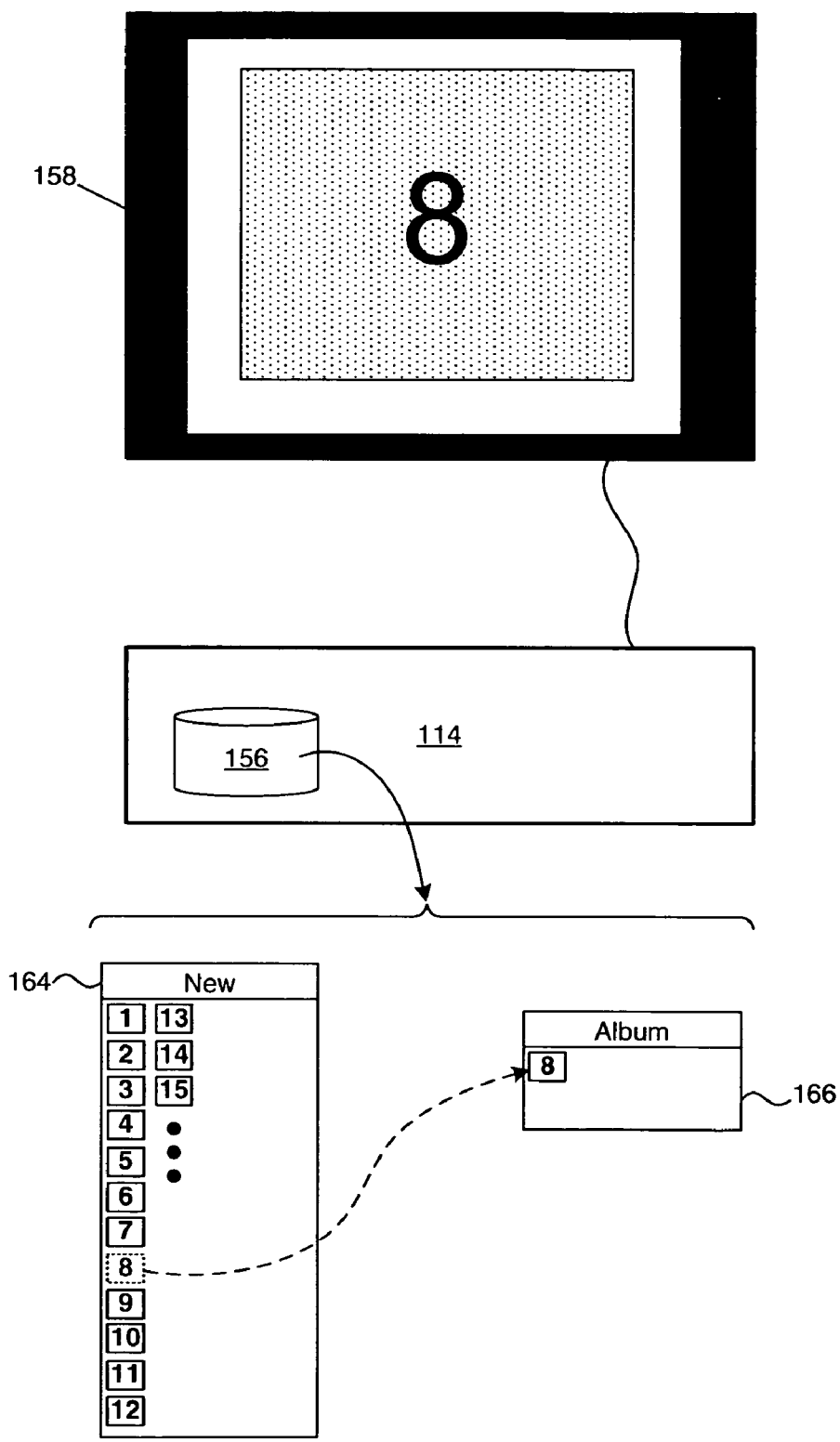
FIG. 5 shows, in partially schematic form, enlargement of an image corresponding to a selected thumbnail and movement of a corresponding image file.

As shown in FIG. 5, the user then selects a thumbnail image of interest (thumbnail 8), and the image is enlarged on display 158. The user may, for example, be reviewing various images that he or she has allowed to accumulate in memory 156 and deciding which images should be saved and which images discarded. As the user peruses the relatively low-resolution thumbnails, he or she identifies an image of interest and causes the image to be enlarged by highlighting the thumbnail and pressing an "enter" or other appropriate key, by double-clicking the image with a mouse-controlled cursor, or in some other manner. When thumbnail image 8 is enlarged, processor 142 automatically moves image file 8 from its initial location in the "New" folder 164 to a separate organizational folder (or "album") 166. Album 166 is created automatically when the user selects a thumbnail image in a thumbnail view interface (FIG. 4) for enlargement (FIG. 5). In accordance with at least one embodiment, the album 166 may be created prior to display of the thumbnail view interface, such as the thumbnail view interface shown in FIG. 4. Album 166 may be created or reopened when a program to review image files is initiated. In at least some embodiments, server 114 automatically generates a name for album 166 based on the date and/or time of album creation and/or metadata information in the files. For example, if the selected files have similar metadata information regarding a topic, location, context, etc., such metadata information may be used to create a common name for the folder or album. With or without any descriptive title, the albums may be represented to the user in a time line presentation by the time of creation of the album or by the time when the images were captured. The user may then rename the album at a later time. In other embodiments, server 114 prompts the user for a name when creating the album.

Although the preceding and following description refer to moving an image data file between folders and storage of data files "in" folders, this is only for ease of explanation. All data files in a folder may not have contiguous memory locations, and movement of a data file between folders may not involve movement of the data file to a new memory location. In some embodiments, for example, a data file is stored in a folder by associating with that folder a pointer to the data file's memory address. As used in this specification (including the claims), storage of a data file in a folder (such as, e.g., moving a data file to that folder from another folder) only requires that the data file be associated in some way with the folder in which it is stored. One embodiment of aspects of the present invention adds metadata information into the data file that describes the association and linkage to a specific folder or album.

Figure 6:
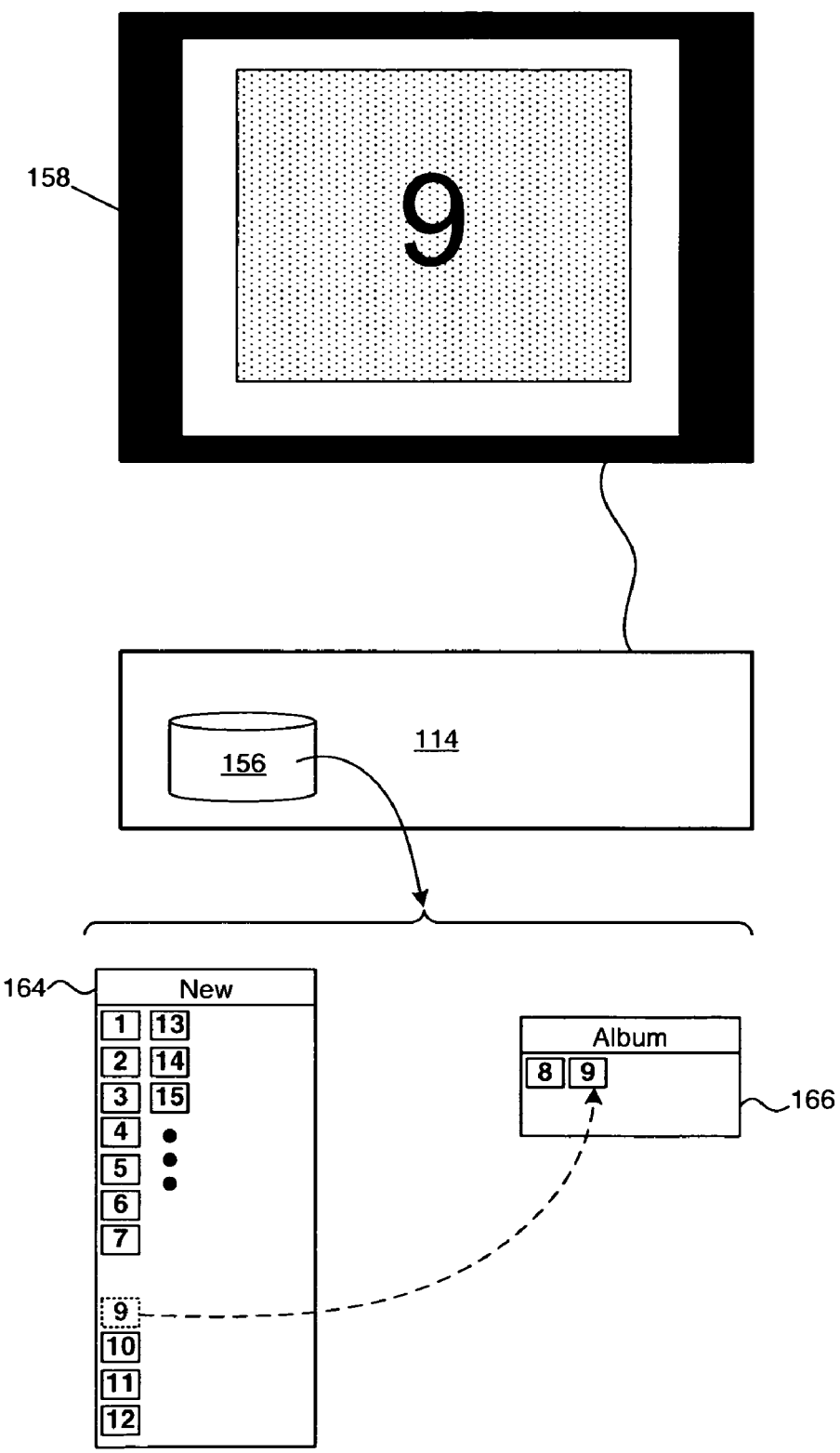
FIG. 6 shows, in partially schematic form, enlargement of an image corresponding to a thumbnail and movement of a corresponding image file.

As shown in FIG. 6, the user then enlarges thumbnail image 9. In the example of FIG. 6, the user has progressed directly from the display of FIG. 5 to the display of FIG. 6 without first returning to the thumbnail interface of FIG. 4. The user does so in various ways in different embodiments. In some embodiments, a separate remote control (not shown in the drawings) for server 114 has buttons corresponding to "next" and "previous" commands; in still other embodiments, mobile device 112 is usable as a remote controller for server 114 and has (or is configurable to have) "next" and "previous" buttons. When the user presses the "next" button while viewing an enlarged image, the next image file (in the example, image file 9) in folder 164 is displayed in enlarged form. In other embodiments, an enlarged image view includes arrows (similar to arrows 160 of FIG. 4) or other on-screen user interface which a user selects to proceed to the next (or previous) image.

As the user enlarges thumbnail image 9, the corresponding image file is automatically moved into album 166. If the user were to then proceed directly to an enlarged view of the next thumbnail image (image 10), the corresponding image file 10 would also be automatically moved into album 166. In accordance with at least one embodiment of the invention, as long as the user continues to view enlarged images without returning to the thumbnail interface, the corresponding files for those images will be moved into album 166. However, in such embodiments, if the user returns to the thumbnail image interface, server 114 ceases to automatically transfer image files to album 166. If the user then selects another image from the thumbnail interface, a new album is automatically created, and the corresponding image file moved to the new album. In accordance with at least one embodiment of the present invention, the user can return to the thumbnail interface, such as the thumbnail interface shown in FIG. 4, choose another image file, such as image file 13 shown in FIG. 4, and the server will continue to automatically transfer image files, such as image file 13, to album 166.

Figure 7:
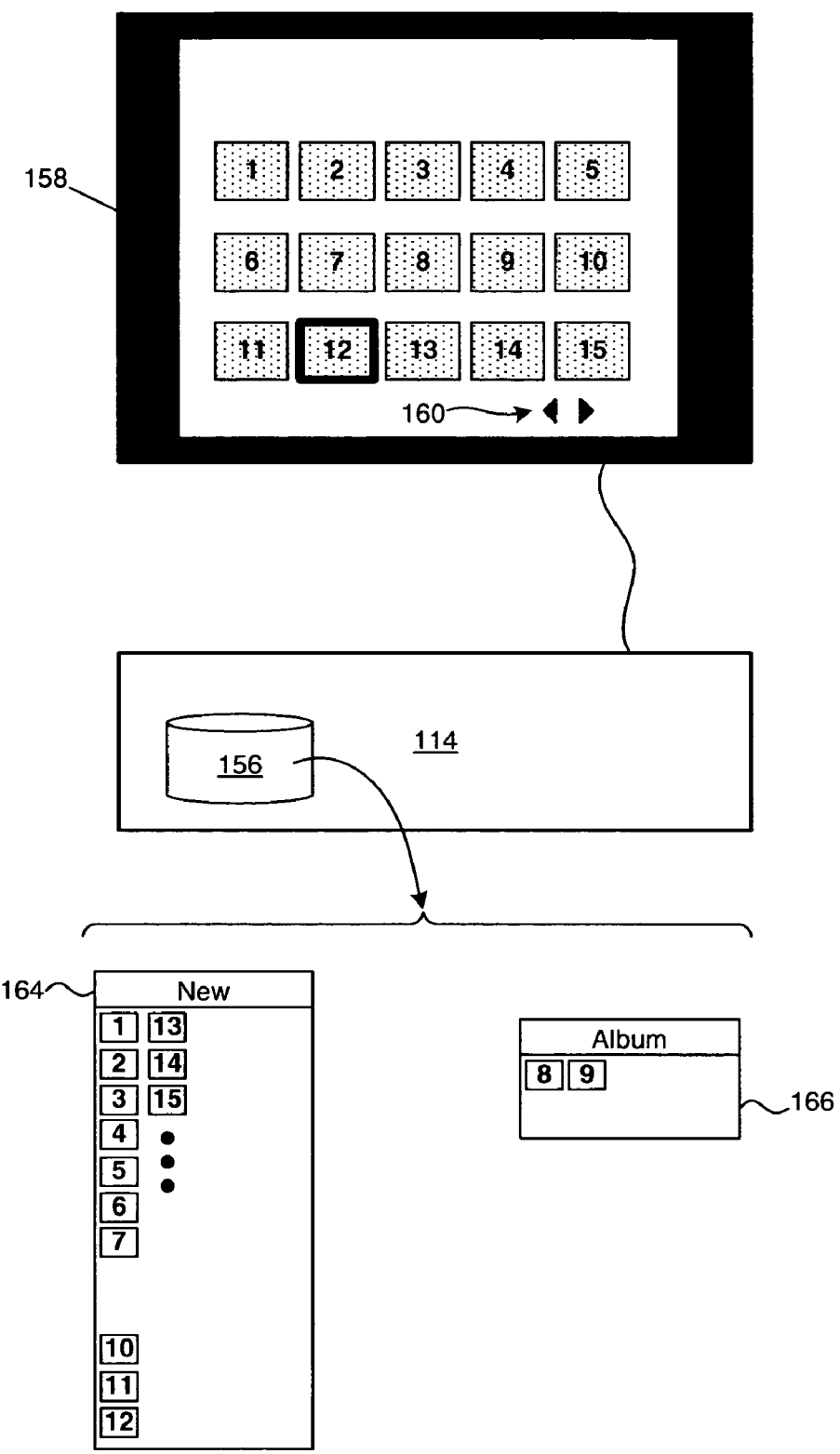
FIG. 7 shows, in partially schematic form, a thumbnail view of multiple images on a display and storage of corresponding image files.
Figure 8:
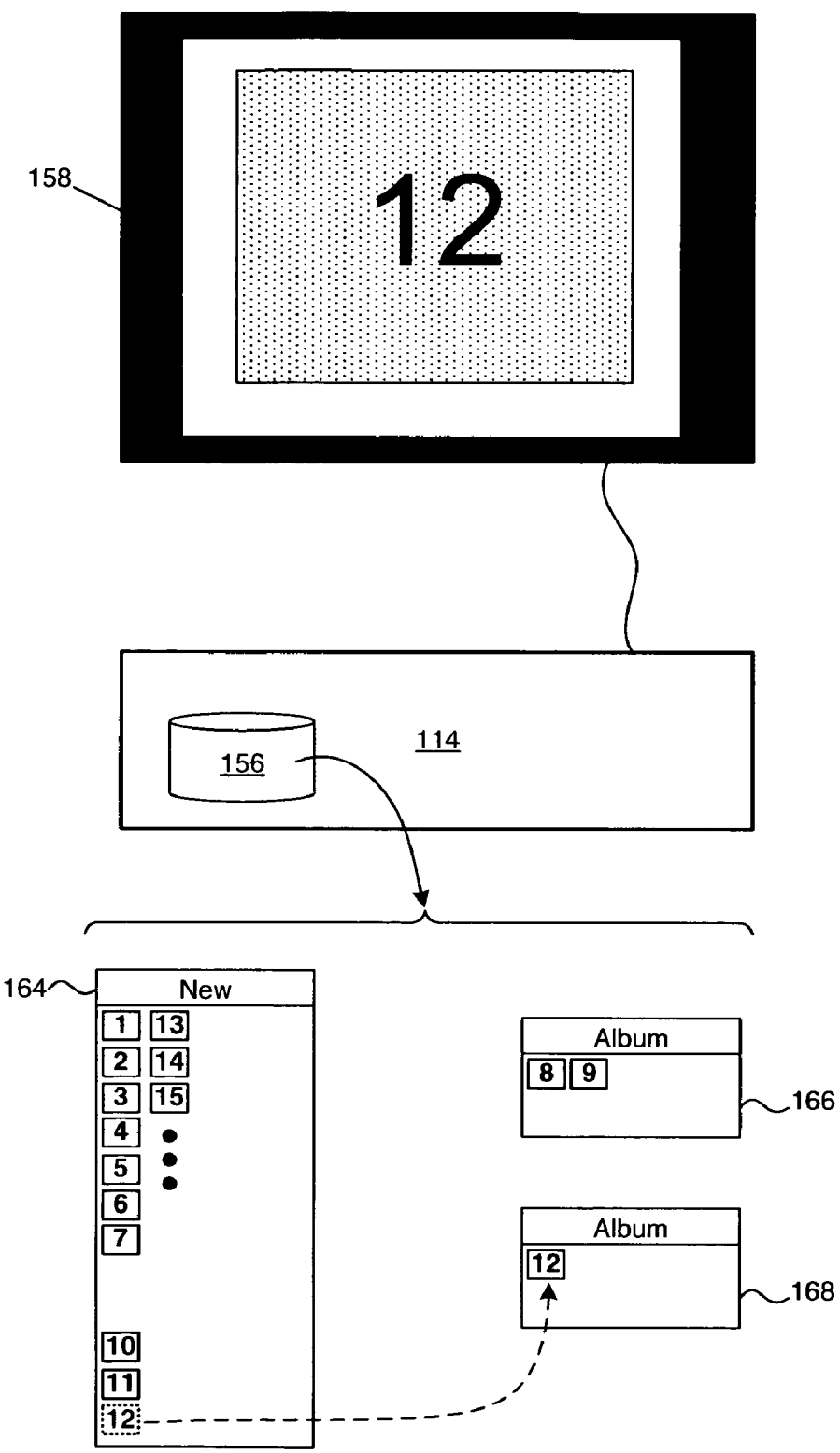
FIGS. 8-10 show, in partially schematic form, enlargement of images corresponding to thumbnails and movement of corresponding image files.

As shown in FIG. 7, for example, the user returned to the thumbnail interface from an enlarged view of image 9. Accordingly, album 166 now contains the image files for images 8 and 9, and those files are no longer in folder 164. The user then selects thumbnail image 12 for enlargement (shown in FIG. 7 by a bold outline of thumbnail 12). Upon enlargement of thumbnail image 12, and as shown in FIG. 8, server 114 creates a new album 168 and moves the file for image 12 into album 168. If the user then proceeds directly to another enlarged image without returning to the thumbnail interface, the corresponding file for that image will also be moved to album 168. If the user returns to the thumbnail interface, server 114 will cease automatic transfer of image files to album 168, and will create a new organizational folder upon user selection of another thumbnail image. As described above, in accordance with at least one embodiment of the present invention, the server permit a user to return to the thumbnail interface, select an additional image file, and have that image file moved into album 166 with image files 8 and 9. In accordance with at least one embodiment, image files from different sources may also be transferred into the same album 166.

Figure 9:
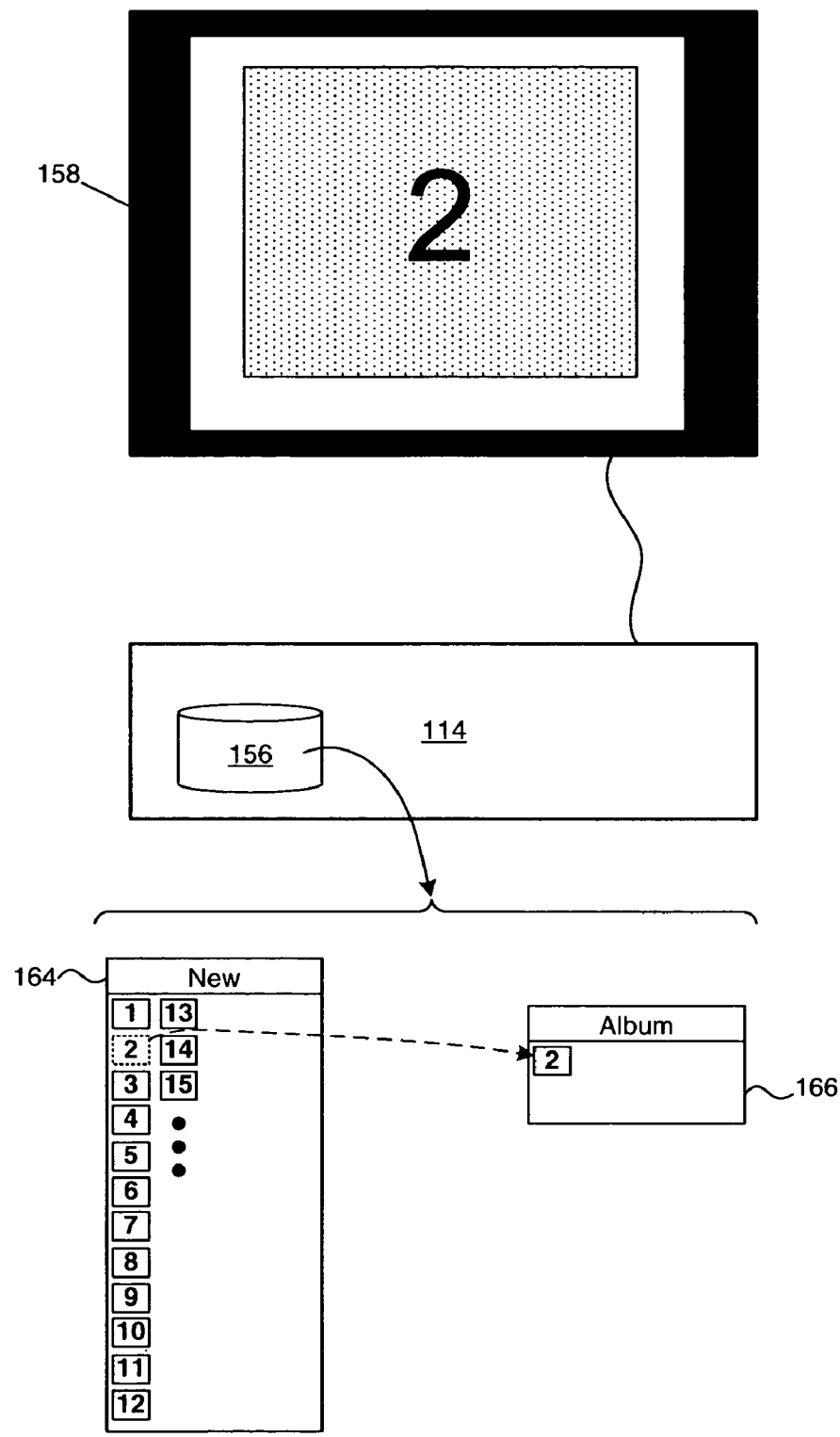
Figure 10:
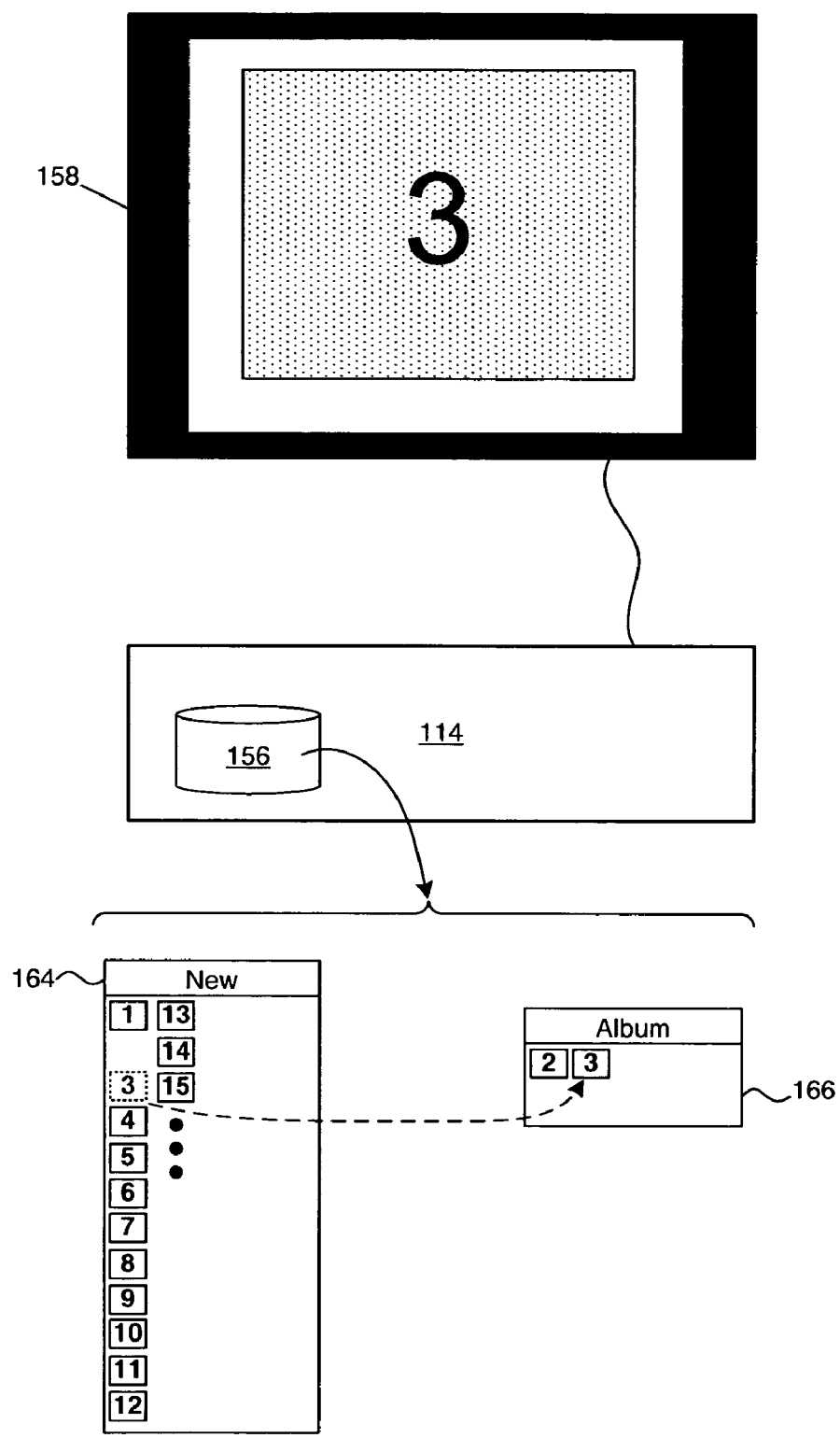
Figure 11:
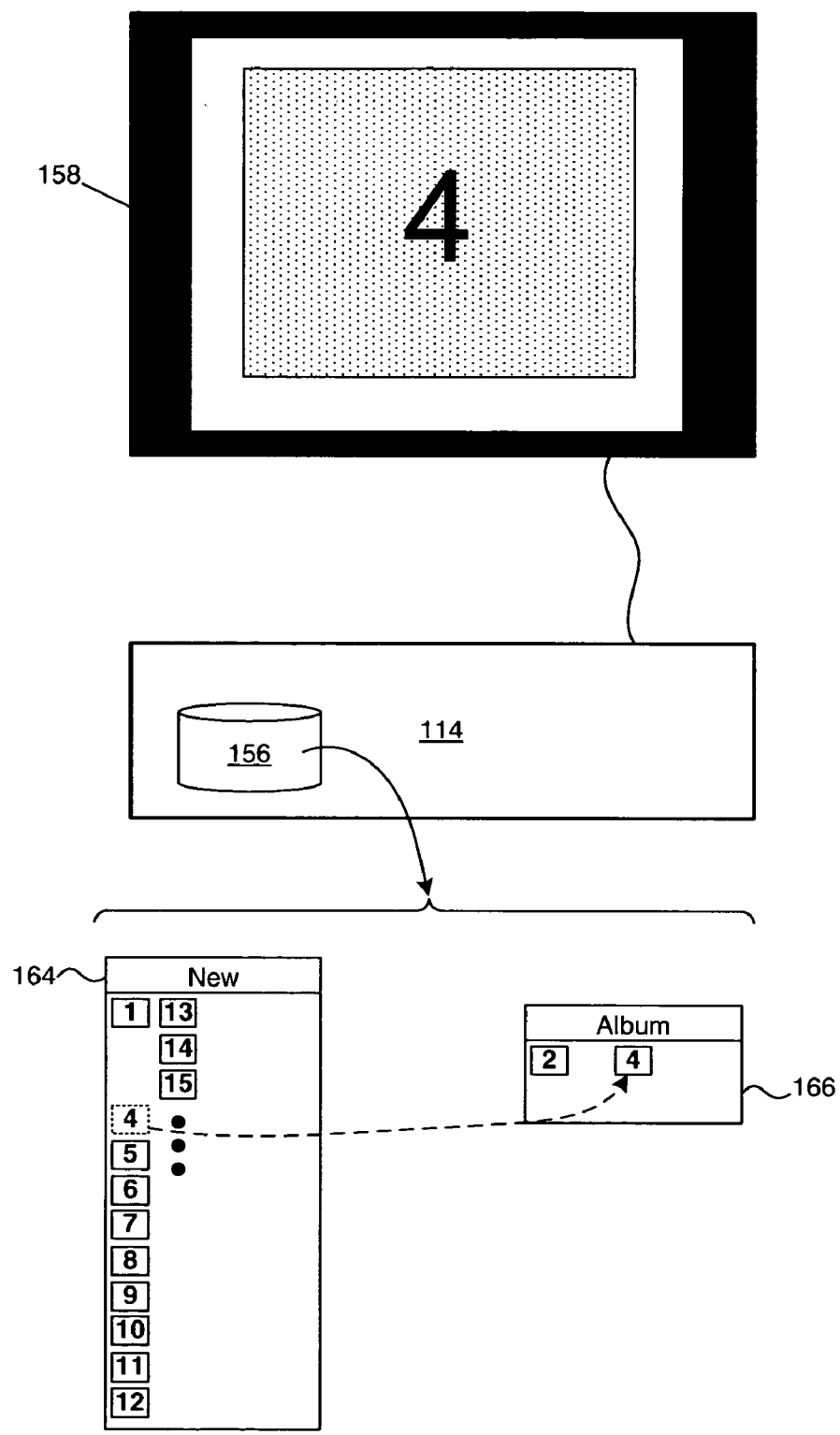
FIG. 11 shows, in partially schematic form, enlargement of an image corresponding to a thumbnail, movement of a corresponding image file and deletion of an image file.

In at least some embodiments of the present invention, the user has the option to input requests to perform certain functions on the data files. By use of such an instruction, the user can select, activate, present, edit, listen to, watch, rotate, save, delete, hide, enlarge, copy, move, open, and print, among other functions. FIGS. 9-11 illustrate one example for deleting or hiding an image file.

In at least some embodiments, the user also has the option to delete or hide an image file when displaying an enlarged view of the image, thereby preventing permanent storage of the image file in an album. This is illustrated in FIGS. 9-11. In FIG. 9, the user has selected image 2 from the thumbnail interface for enlargement, and the corresponding image file is then automatically moved to album 166. In FIG. 10, the user has proceeded directly to an enlarged view of image 3. However, the user decides that image 3 is not satisfactory, and the user does not wish to retain image 3.

Accordingly, the user discards the image by pressing a "delete", "hide", or similar key on mobile device 112 (or on some other input device for server 114) or by selecting an on-screen "delete", "hide", or similar interface (not shown). Upon deleting or hiding image 3, and as shown in FIG. 11, the next image (image 4) is automatically enlarged, the image file for image 3 is deleted from album 166, and the image file for image 4 is automatically moved to album 166. In this manner, the user is able to avoid returning to the thumbnail interface if the user does not wish to retain a particular image, and is able to continue automatic placement of other images in the same album. In other embodiments, an image file is not deleted when the user presses the delete key, and is instead moved back to folder 164.

After image files are automatically stored in separate albums, the user may then rename or otherwise reorganize those albums. For example, the user may combine several albums into a single album, may add individual images to an album, or may delete images from an album. When the user later wishes to view images for a particular event (or which are otherwise related in some way), the user need only go to the appropriate album.

Figure 12:
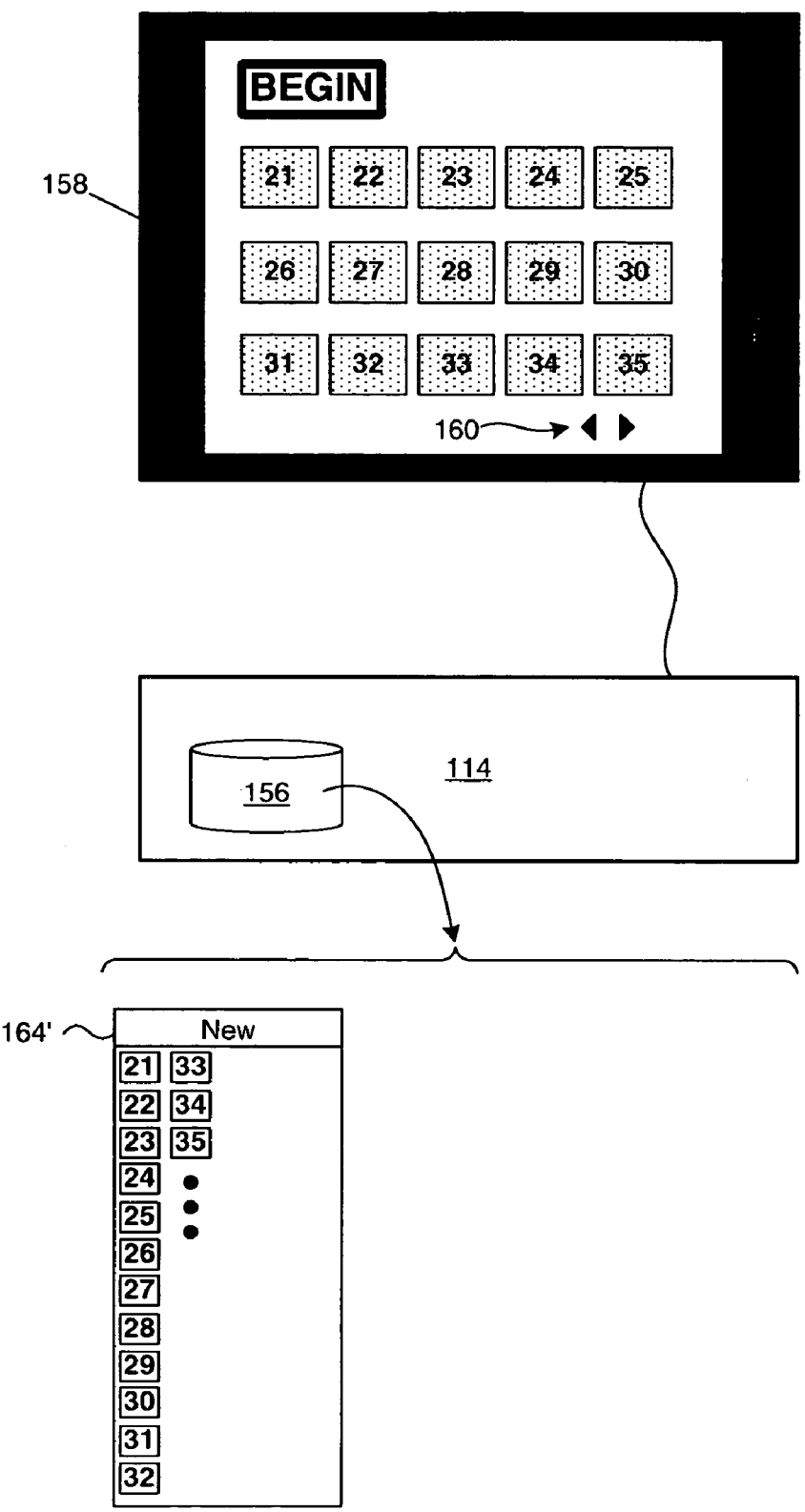
FIGS. 12-16 show, in partially schematic form, thumbnail views of multiple images and enlarged views of images, as well as storage of corresponding image files, according to other embodiments of the invention.
Figure 13:
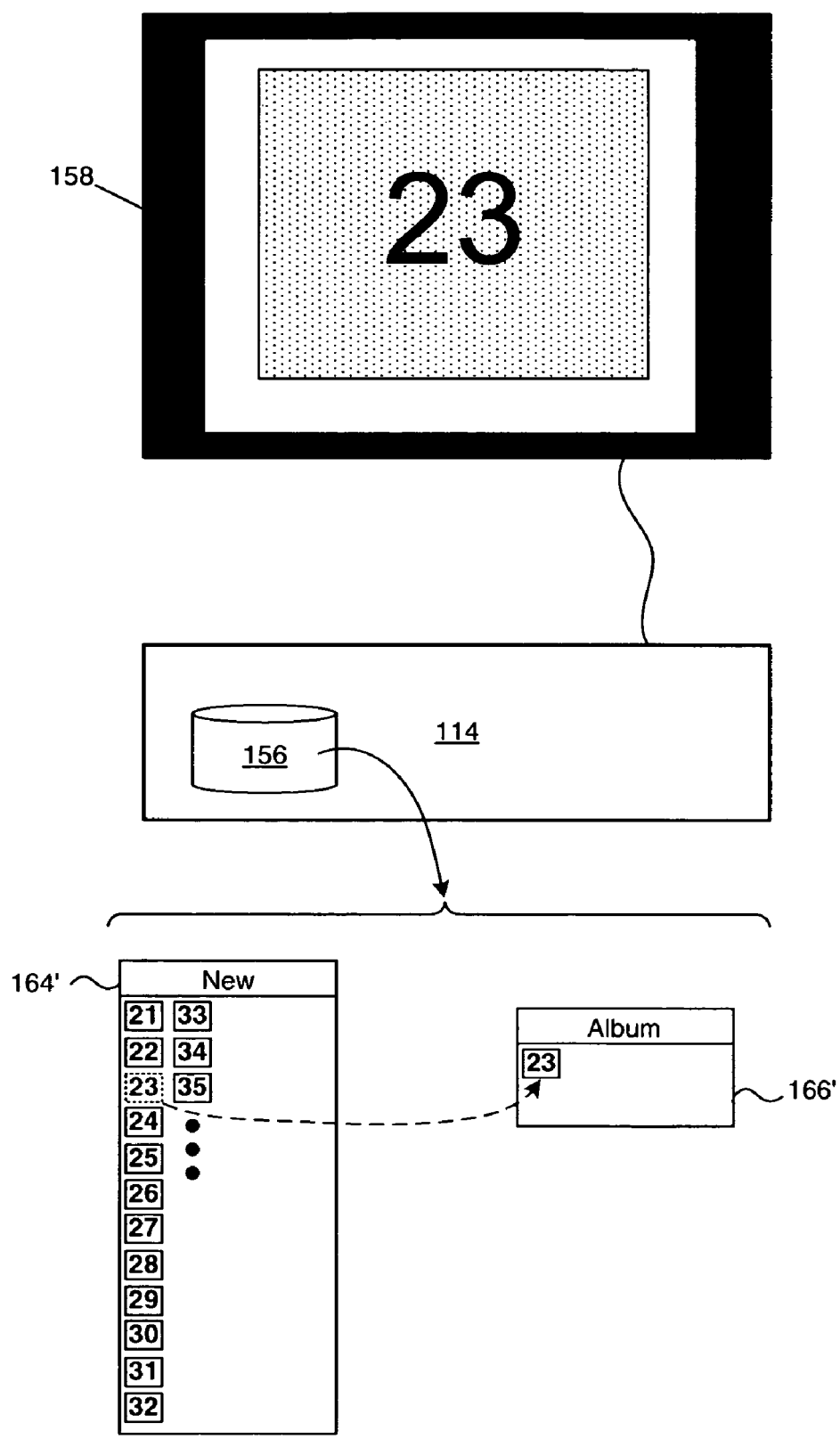
Figure 14:
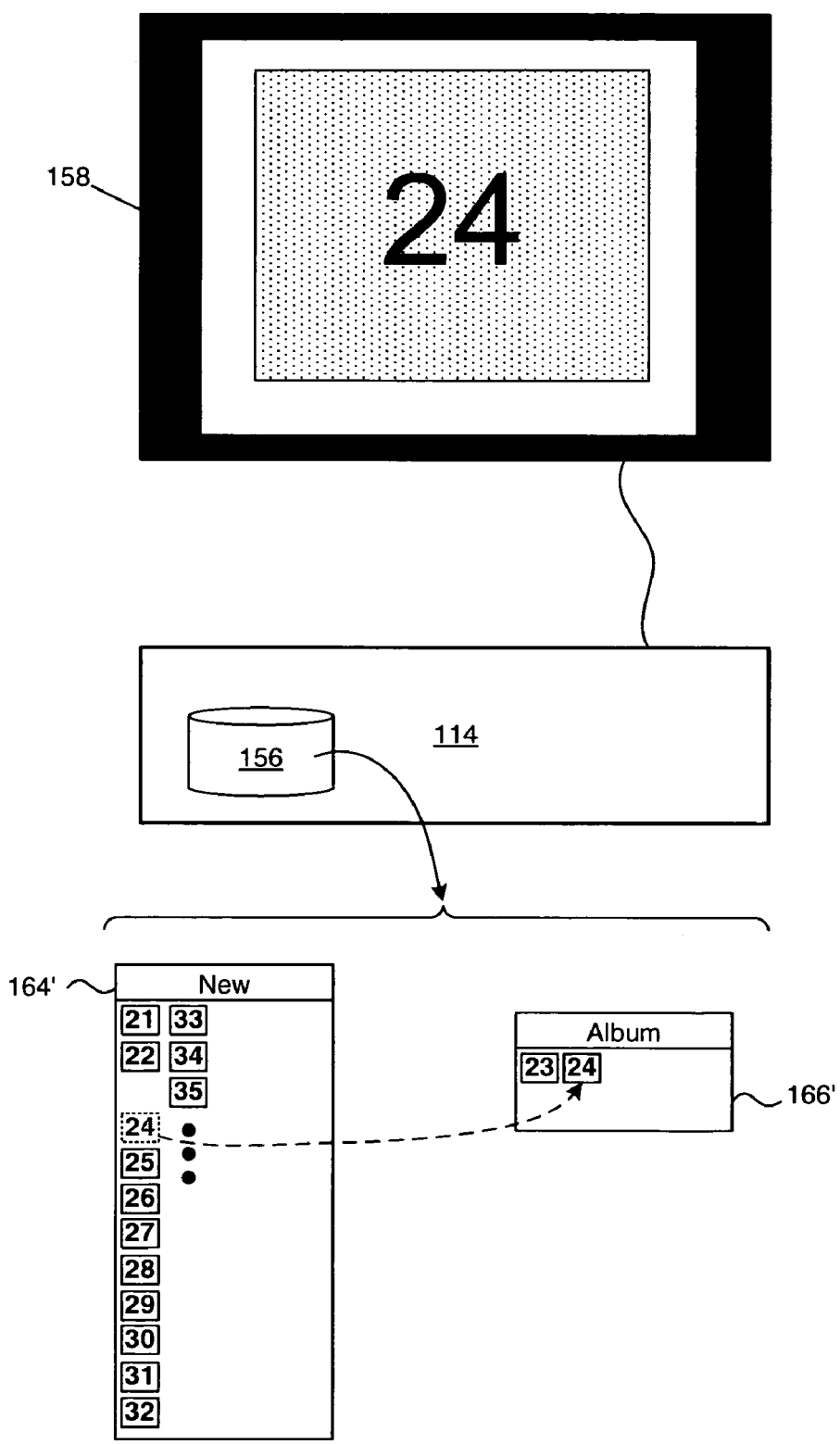

In other embodiments, a user is able to move between enlarged image views and the thumbnail interface while automatically storing images in a single album. In these embodiments, the user specifies that he or she is initiating a session to review and/or organize new images. Until the user indicates that the session is concluded (whether by specific command, by logging off of server 114, or in some other manner), all images viewed in enlarged view are moved to a single album. Operation of several of these embodiments is illustrated in FIGS. 12-16. As shown in FIG. 12, the user has initiated a reviewing session by selecting a "begin" user interface. Thumbnails for images 21-35 are displayed and files for images 21-35 are temporarily stored in "New" folder 164'. In some embodiments, a user initiates a reviewing session via another user interface or by pressing an appropriate button on mobile device 112 (or on some other input device for server 114). In FIG. 13, the user has selected thumbnail image 23 for enlargement and views a full-screen display of that image. Server 114 automatically places the corresponding image file for image 23 in an album 166'. The user then proceeds to image 24 without returning to the thumbnail interface (as shown in FIG. 14), causing the corresponding file for image 24 to be moved to album 166'. As in the embodiment of FIGS. 9-11, the user is also able to delete or hide image 24 without returning to the thumbnail interface.

Figure 15:
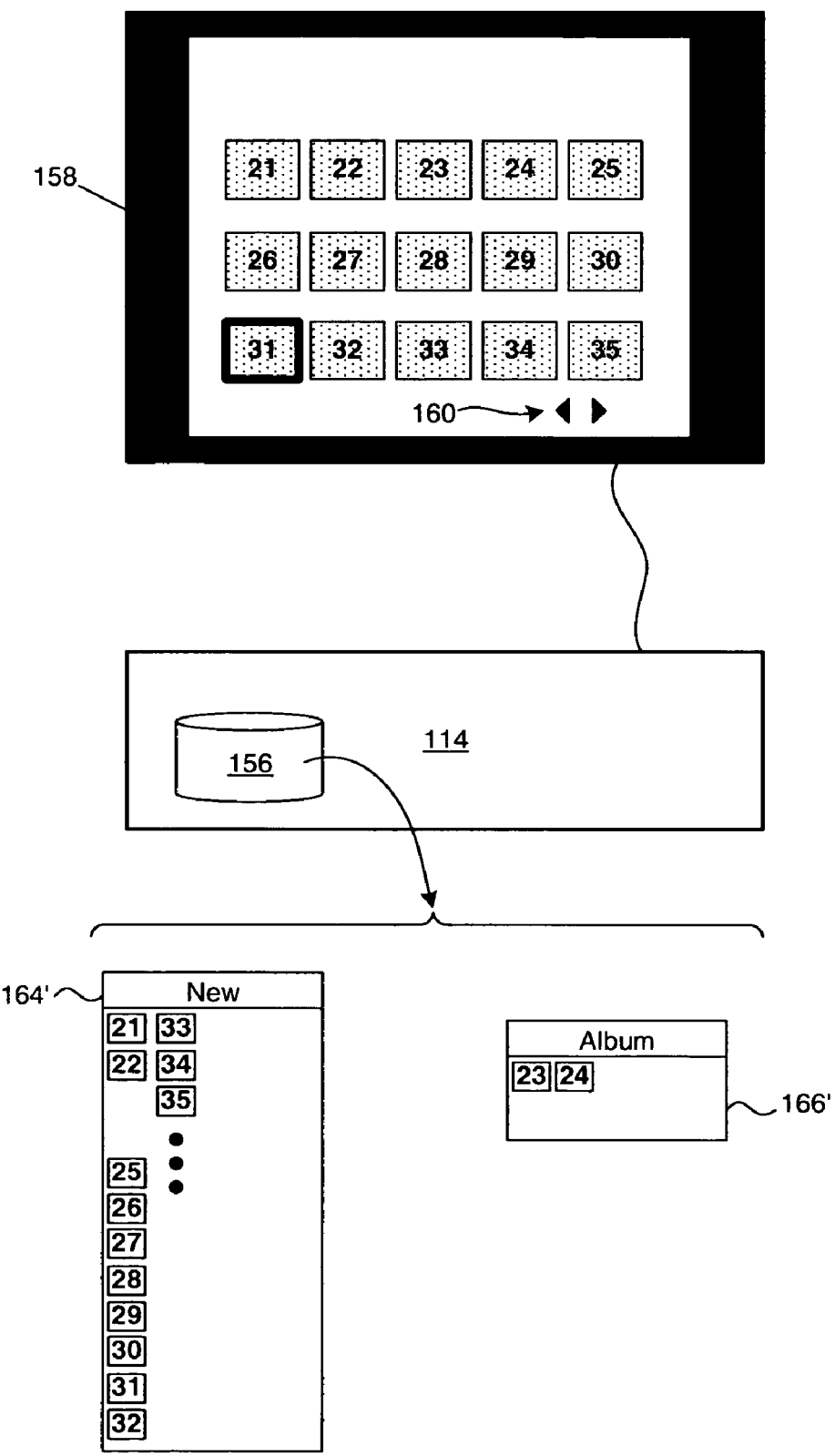
Figure 16:
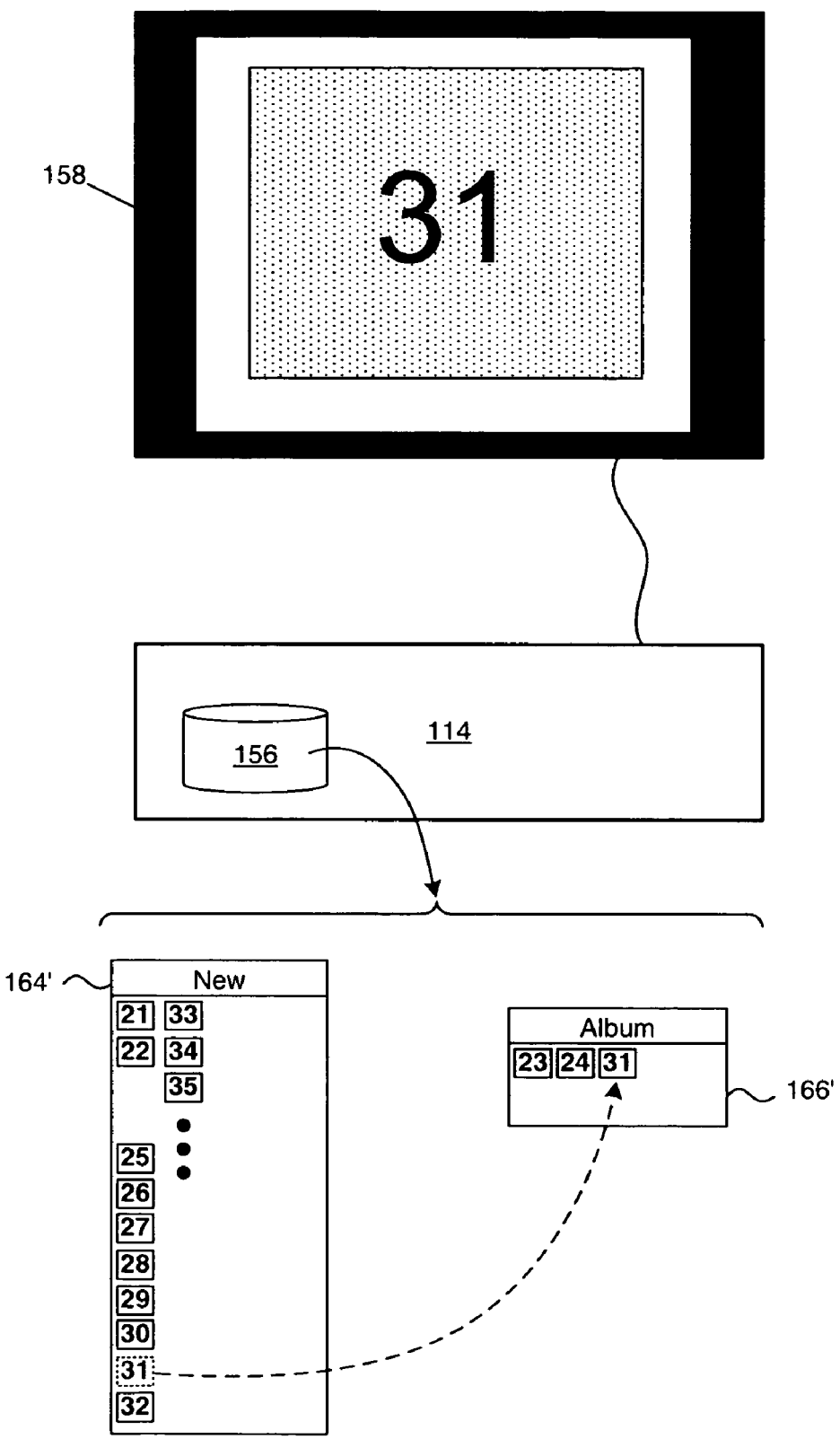

In this case, however, the user elects not to delete or hide image 24, but decides to return to the thumbnail interface (FIG. 15). After reviewing several more thumbnails without enlarging the images for those thumbnails, the user selects image 31 for enlargement. When image 31 is enlarged (FIG. 16), the corresponding image file is moved to album 166'. The user can then delete or hide this image (thereby causing deletion of image file 31 from album 166'), can move directly to an enlargement of the next thumbnail (image 32), or can return to the thumbnail interface. The user continues in this manner until ending the review session by selecting an "end" user interface (not shown), via another user interface, or by pressing an appropriate button on mobile device 112 (or on some other input device for server 114). As previously indicated, the user can terminate a reviewing session in at least some embodiments by turning off (or logging off) server 114.

In still other embodiments, a user may end a reviewing session, and then recommence the same reviewing session at a later time. In other words, after ending a reviewing session, a user may view other images, perform other operations with server 114, turn off server 114, etc. Subsequently, the user begins a reviewing session and specifies (via an appropriate user interface, not shown) that enlarged images should be placed in a pre-existing album (e.g., album 166') instead of a new album. Indeed, a user may temporarily suspend a first reviewing session during which images were moved to a first album, may then initiate another reviewing session during which images are moved to a second album, and may then resume movement of images to the first album.

Figure 17:
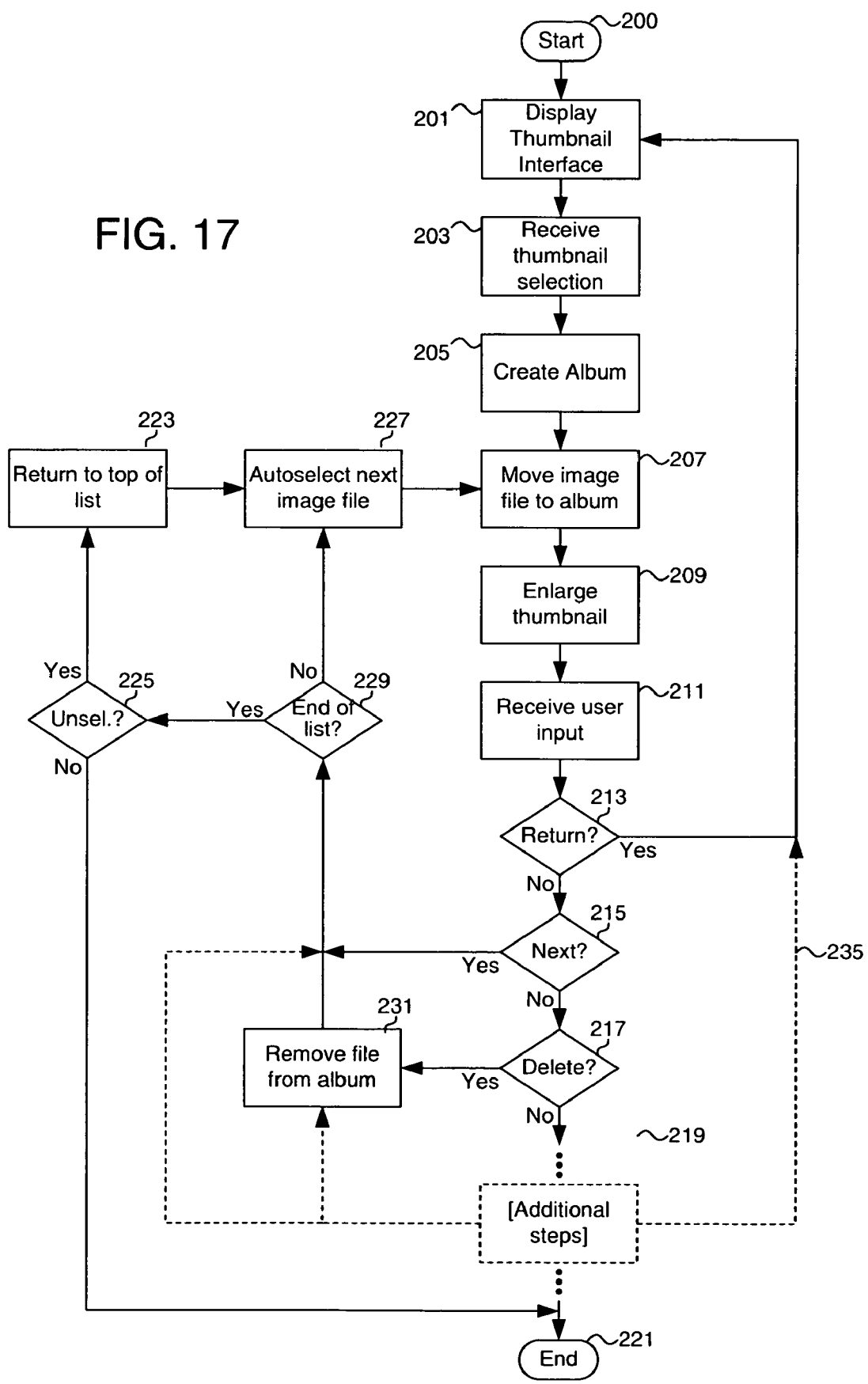
FIG. 17 is a flow chart showing, according to at least some embodiments of the invention, operation of a server in a manner similar to that described in connection with FIGS. 4 through 11.

FIG. 17 is a flow chart showing, according to at least some embodiments of the invention, operation of a server such as is described in connection with FIGS. 4-11, above. After starting at block 200, a thumbnail view user interface is displayed at block 201. After displaying the thumbnail interface, the server awaits user selection of a thumbnail image for enlargement. At block 203, a selection of a thumbnail is received, thereby automatically selecting a corresponding image file. At block 205, the server creates an album in which to place images files. The server then proceeds to block 207 and moves the selected image file to the album created at block 205. After moving that image file to the album, the server displays an enlarged view of the selected thumbnail at block 209. After displaying the enlarged view of the selected thumbnail, the server awaits further user input.

After receiving additional user input at block 211, the server proceeds to block 213. At block 213, the server first determines if the user input is a request to return to the thumbnail interface. On returning to the thumbnail interface, and as previously described in connection with FIGS. 4-8, no further image files will be automatically moved into the album created at block 203. If the user input is a request to return to the thumbnail interface, the server proceeds on the "yes" branch from block 213 to block 201, where the server redisplays the thumbnail interface. After returning to block 201, the server again awaits selection of a thumbnail from the thumbnail interface. Upon receiving a selection, the server goes to block 203 and automatically creates a new album.

If the user input received at block 211 was not a request to return to the thumbnail interface, the server proceeds on the "no" branch from block 213 to block 215. At block 215, the server determines if the user input is a request to proceed directly to an enlarged version of the next thumbnail without first returning to the thumbnail interface (e.g., as described in connection with FIGS. 4-6). If so, the server proceeds on the "yes" branch from block 215 to block 229. At block 229, the server determines if the user is at the end of the list of images that were displayed as thumbnails in the thumbnail interface (or that were displayable as thumbnails on subsequent pages of a thumbnail interface). If not, the server proceeds on the "no" branch from block 229 to block 227. At block 227, the server automatically selects the next image file from the folder in which recently transferred and/or previously unorganized image files (such as folder 164 in FIG. 4) are stored. In other words, the server automatically selects the image file corresponding to the thumbnail immediately following the thumbnail most recently selected by the user. If, for example, the user selected thumbnail image 5 in FIG. 4 and then enlarged the next image without returning to the thumbnail interface, the server would automatically select image file 6 at block 227. In at least some embodiments, the next image file may be for the image created immediately before (or after, depending on whether the files are stored in ascending or descending order) the image corresponding to the most-recently selected thumbnail. After automatically selecting the next image file at block 227, the server returns to block 207. The server moves the selected image file to the album created at block 203 and then displays an enlarged (i.e., non-thumbnail) view of that image at block 209.

If the server determines at block 229 that the end of the list of transferred/unreviewed images has been reached, the server proceeds to block 225. At block 225, the server determines if there are any remaining image files in the list for which the user did not review an enlarged image. For example, if the user started the session by selecting a thumbnail in the middle of the list and proceeded to the end, there would still be image files at the top of the list not displayed in an enlarged view. If there are remaining image files in the list, the server proceeds on the "yes" branch to block 223. The server returns to the top of the list at block 223 and then automatically selects the next image file (at the top of the list) at block 227, after which the server returns to block 207. If there are no remaining image files in the list, the server proceeds on the "no" branch to end block 221.

If at block 215 the user input was not a request to proceed directly to an enlarged version of the next thumbnail image, the server proceeds to block 217. At block 217, the server determines if the user input was a request to delete or hide the image file displayed in the enlarged view at block 209. If so, the server proceeds on the "yes" branch from block 217 to block 231, where the image file is deleted from the album (e.g., as described in connection with FIGS. 9-11). From block 231, the server proceeds to block 229. If the user input was not a request to delete or hide the image file displayed in the enlarged view, the server proceeds on the "no" branch from block 217 to one or more additional commands (shown collectively as block 219). In various embodiments, these commands can include things such as renaming an image, renaming an album, or various other types of commands. Some of these additional commands may result in return to block 201 (see dotted line 235), while others may result in termination of the method (see dotted line to end block 221). Still other additional commands may proceed to block 231 or to block 229.

Figure 18:
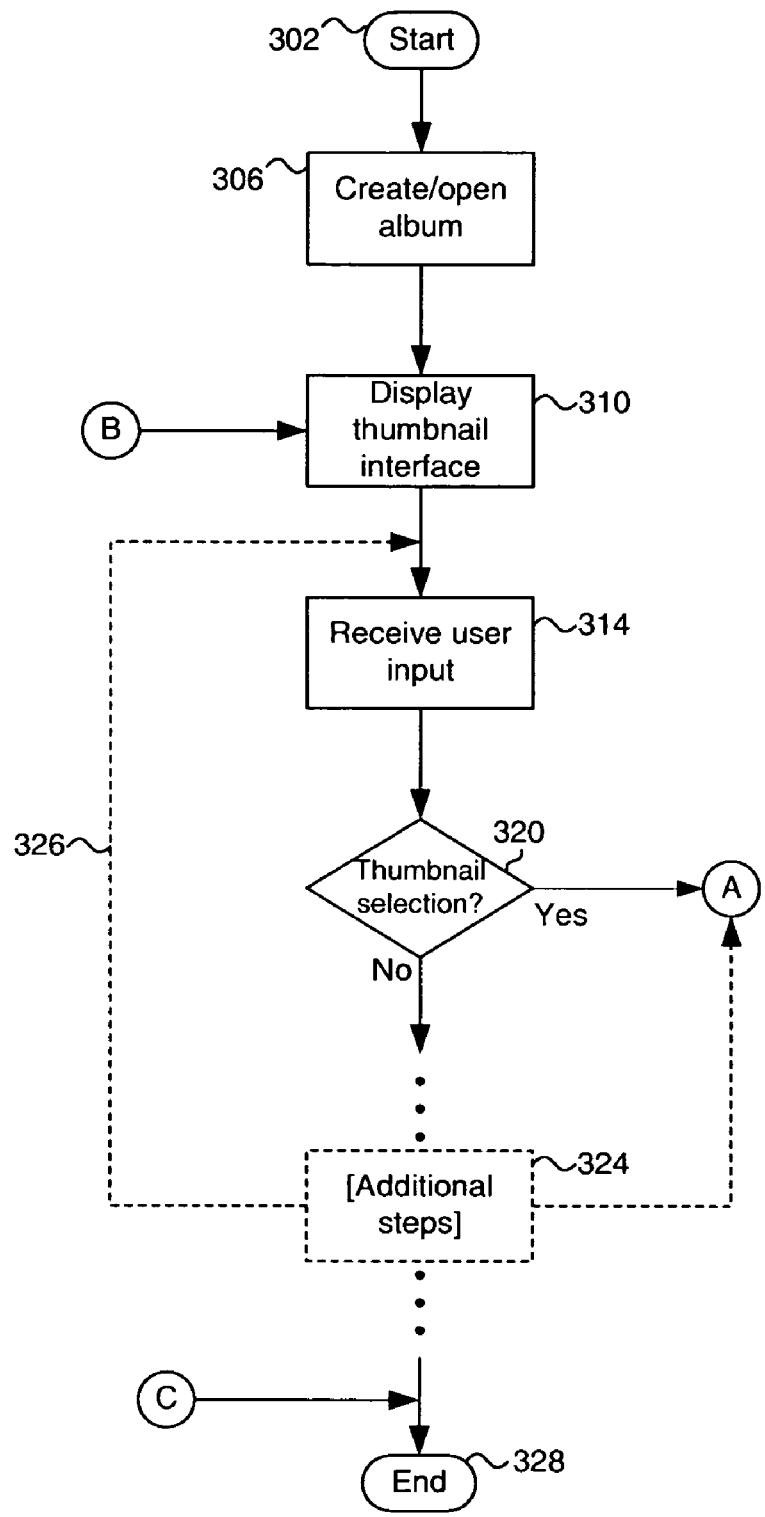
FIGS. 18 and 19 are flow charts showing, according to at least some embodiments of the invention, operation of a server in a manner similar to that described in connection with FIGS. 12 through 16.
Figure 19:
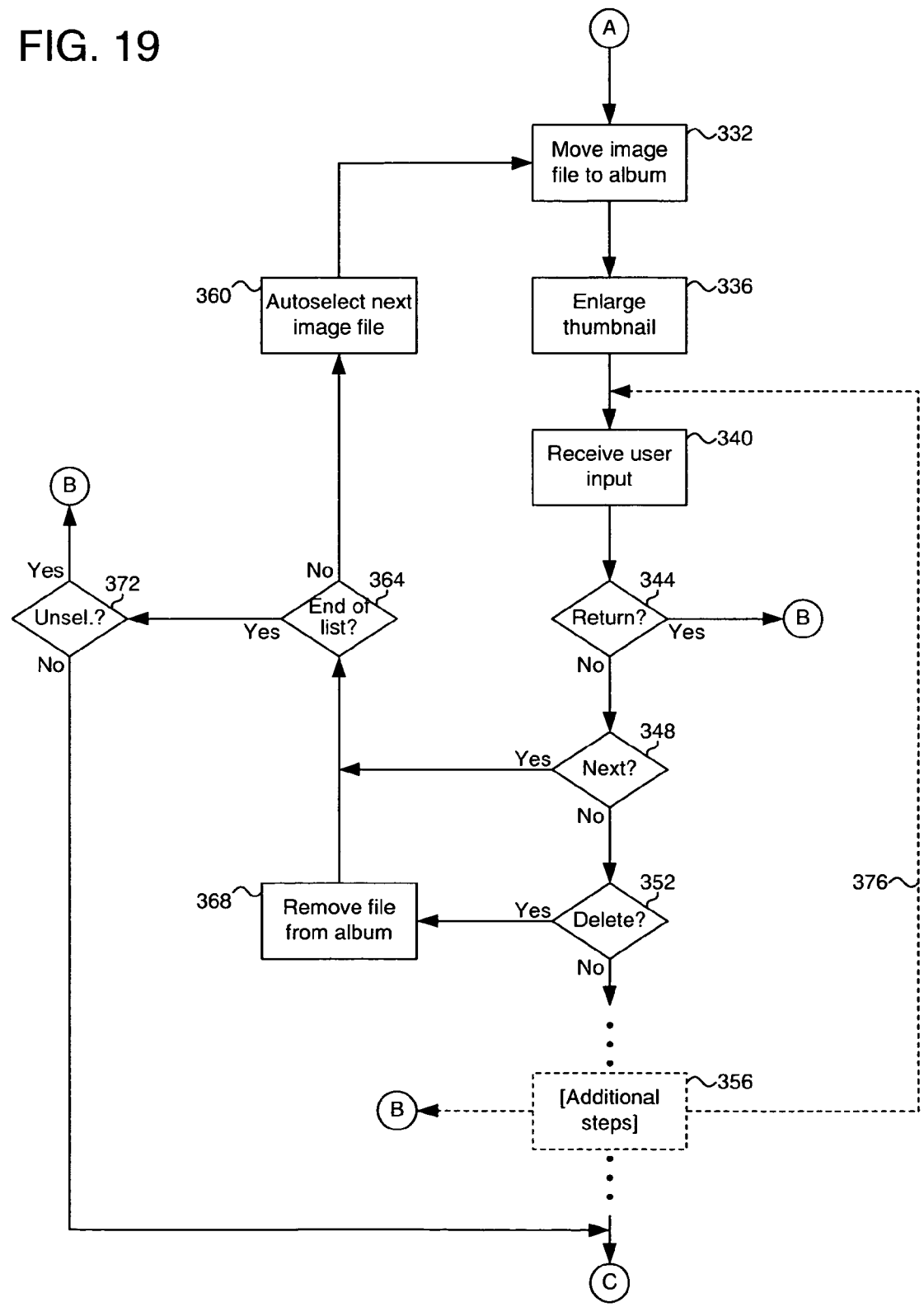

FIGS. 18 and 19 are flow charts showing, according to at least some embodiments of the invention, operation of a server such as is described in connection with FIGS. 12-16, above. The server begins an image organizational session at start block 302. At block 306, the server either creates a new album or opens a previously created album. At block 310, the server displays an interface presenting a view of thumbnail images corresponding to the image files in a list of recently transferred or otherwise unreviewed image files (e.g., folder 164' in FIG. 12). After block 310, the server awaits user input.

After receiving user input at block 314, the server proceeds to block 320. At block 320, the server first determines if the received input is a user selection of a thumbnail image. If so, the server proceeds on the "yes" branch from block 320, via off-page connector A, to block 332 (FIG. 19). At block 332, the server moves the image file for the selected thumbnail to the album created/opened at block 306. The server then proceeds to block 336, where the selected thumbnail is displayed as an enlarged image. After block 336, the server awaits further user input.

After receiving further user input at block 340, the server first determines at block 344 whether the input is a request to return to the thumbnail interface. If so, the server proceeds on the "yes" branch from block 344, via off-page connector B, to block 310 (FIG. 18). On returning to block 310, the server returns to the thumbnail interface, but does not end the current session. If the server determines at block 344 (FIG. 19) that the input is not a request to return to the thumbnail interface, the server proceeds on the "no" branch from block 344 to block 348. At block 348, and similar to block 215 of FIG. 17, the server determines if the user input is a request to proceed directly to an enlarged version of the next thumbnail image. If so, the server proceeds on the "yes" branch to block 364. At block 364, similar to block 229 of FIG. 17, the server determines if the user is at the end of the list of images that were displayed as thumbnails. If not, the server proceeds on the "no" branch to block 360, where the server automatically selects (similar to block 227 of FIG. 17) the next image file from the folder in which recently transferred and/or previously unreviewed image files are stored, after which the server returns to block 332.

Upon return to block 332, the server moves that selected image file to the album created or opened at block 306, and then displays an enlarged (i.e., non-thumbnail) view of that image at block 336. If the server determines at block 364 that it has reached the end of the list, the server proceeds to block 372. At block 372, and similar to block 225 of FIG. 17, the server determines if there are any remaining image files in the list. If so, the server proceeds on the "yes" branch via off-page connector B to block 310 (FIG. 18) and redisplays the thumbnail interface. From the thumbnail interface, the user can select a thumbnail corresponding to one of the image files remaining in the list. In other embodiments, and similar to the embodiments described in connection with FIG. 17, the server returns to the top of the list and then proceeds to block 360. If the server determines at block 372 (FIG. 19) that there are no more image files in the list, the server proceeds on the "no" branch, via off-page connector C, to end block 328 (FIG. 18) and terminates the session.

If the server determines at block 348 that the user input is not a request to proceed directly to an enlarged version of the next thumbnail image, the server proceeds to block 352. At block 352, and similar to block 217 of FIG. 17, the server determines if the user input was a request to delete or hide the image file displayed in the enlarged view. If so, the server deletes the image file from the album (created/opened at block 306) at block 368, and then proceeds to block 364. If not, the server proceeds on the "no" branch from block 352 to perform one or more additional steps, shown collectively as block 356. In various embodiments, these commands can include things such as renaming an image, renaming an album, or various other types of commands. Some of these additional commands may result in termination of the current session (see dotted line to off-page connector C), while others may result in return to the thumbnail interface (see dashed line to off-page connector B) or a return to step 340 (see dashed line 376).

If the user input received at block 314 (FIG. 18) was not a selection of a thumbnail image, the server proceeds on the "no" branch from block 320 to perform one or more additional steps, shown collectively as block 324. In various embodiments, these commands can include things such as saving an image file for a selected thumbnail directly to an album (i.e., without first enlarging the image), renaming an image, renaming an album, or various other types of commands. Some of these additional commands may result in termination of the current session (see dotted line to end block 328), while others may result in selection and enlargement of a thumbnail (see dashed line to off-page connector A) or a return to step 314 (see dashed line 326).

Figure 20:
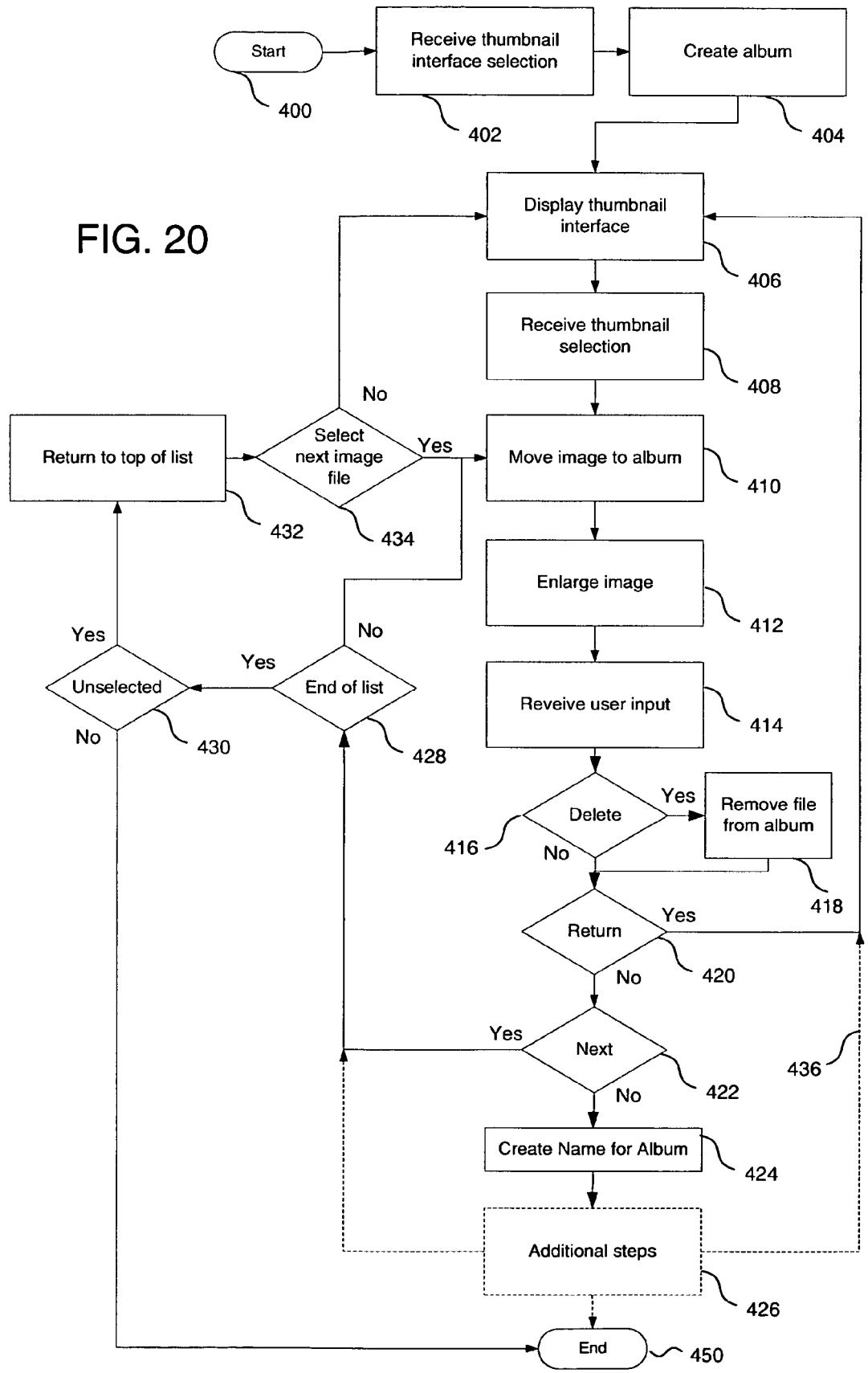
FIG. 20 is a flow chart showing, according to at least some embodiments of the invention, operation of a server.

FIG. 20 is a flow chart showing, according to at least some embodiments of the invention, operation of a server. After starting at block 400, a selection of a thumbnail interface is selected at block 402. At block 404, the server automatically creates an album in which to place image files. The server then proceeds to block 406 where a thumbnail view user interface is displayed. After displaying the thumbnail interface, the server awaits user selection of a thumbnail image for enlargement. A first user input at block 408, such as a selection of a thumbnail is received, thereby automatically selecting a corresponding image file. The server then proceeds to block 410 and moves or copies or stores the selected image file to the album created at block 404, and may add metadata to the selected image file indicating the action at the block 410. After moving that image file to the album, the server displays an enlarged view of the selected thumbnail at block 412. After displaying the enlarged view of the selected thumbnail, the server awaits further user input. In an alternative embodiment, at block 408 the action or command may be other than the selection command, e.g. a file editing or manipulation command, and then the block 412 is an action based on the block 408. Also, the block 404 "Create Album" may happen after block 408.

After receiving additional user input, or a second user input, at block 414, the server proceeds to block 416. At block 416, the server determines if the user input was a request to delete or hide the image file displayed in the enlarged view at block 412. If so, the server proceeds on the "yes" branch from block 416 to block 418, where the image file is deleted from the album. From block 418, the server proceeds to block 420. If the user input was not a request to delete or hide the image file displayed in the enlarged view, the server proceeds on the "no" branch from block 416 to block 420. At block 420, the server first determines if the user input is a request to return to the thumbnail interface. On returning to the thumbnail interface, further image files will be automatically moved into the album created at block 404. If the user input is a request to return to the thumbnail interface, the server proceeds on the "yes" branch from block 420 to block 406, where the server redisplays the thumbnail interface. After returning to block 406, the server again awaits selection of a thumbnail from the thumbnail interface. Upon receiving a selection, the server goes to block 408 and the selection of another thumbnail is received. The server then proceeds to block 410 and moves the selected image file to the album created at block 404.

If the user input received at block 414 was not a request to return to the thumbnail interface, the server proceeds on the "no" branch from block 420 to block 422. At block 422, the server determines if the user input is a request to proceed directly to an enlarged version of the next thumbnail without first returning to the thumbnail interface. If so, the server proceeds on the "yes" branch from block 422 to block 428. At block 428, the server determines if the user is at the end of the list of images that were displayed as thumbnails in the thumbnail interface (or that were displayable as thumbnails on subsequent pages of a thumbnail interface). If not, the server proceeds on the "no" branch from block 428 to block 410.

If the server determines at block 428 that the end of the list of transferred/unreviewed images has been reached, the server proceeds to block 430. At block 430, the server determines if there are any remaining image files in the list for which the user did not review an enlarged image. For example, if the user started the session by selecting a thumbnail in the middle of the list and proceeded to the end, there would still be image files at the top of the list not displayed in an enlarged view. If there are remaining image files in the list, the server proceeds on the "yes" branch to block 432. The server returns to the top of the list at block 432 and then determines if the next image file (at the top of the list) is to be selected at block 434. At block 434, the server determines if the next image file from the folder in which recently transferred and/or previously unorganized image files are stored is selected. If so, the server selects the image file corresponding to the thumbnail immediately following the thumbnail most recently selected by the user returning to block 410. The server moves the selected image file to the album created at block 404 and then displays an enlarged (i.e., non-thumbnail) view of that image at block 412. If, for example, the user selected thumbnail image 5 in FIG. 4 and then enlarged the next image without returning to the thumbnail interface, the server would automatically select image file 6 at block 434. In at least some embodiments, the next image file may be for the image created immediately before (or after, depending on whether the files are stored in ascending or descending order) the image corresponding to the most-recently selected thumbnail. If the server determines that the next image file is not selected, the server returns to block 406 where the thumbnail view user interface is displayed again. If there are no remaining image files in the list at step 430, the server proceeds on the "no" branch to end block 450.

If at block 422 the user input was not a request to proceed directly to an enlarged version of the next thumbnail image, the server proceeds to block 424. At block 424, a name is created for the album. The name may be generated automatically and/or in response to user input. The name may be based upon any metadata including information such as date, time, location, topic, name of creator, name or editor, etc. From block 424, the server proceeds to one or more additional commands (shown collectively as block 426). In various embodiments, these commands can include things such as renaming an image, renaming an album, or various other types of commands. Some of these additional commands may result in return to block 406 (see dotted line 436), while others may result in termination of the method (see dotted line to end block 450). Still other additional commands may proceed to block 428.

If should be understood by those skilled in the art that the following description with reference to transfer of data files is merely for illustrative purposes. Aspects of the present invention allow for transfer of folders, such as a grouping of image files already contained within an album or folder, in a similar manner to the methods described above with reference to image files. For example, a list of image folder names may be presented to a user. The presentation of image folders may be in the same format as described above with reference to image files, e.g., in thumbnail view form. Upon receipt of an entry by the user to select a particular image folder, a new main folder may be created for storing the selected image folder and all image files in that selected image folder. Alternatively, the main folder may be created upon activation of the program for image file and/or image folder transfer. Upon receipt of a second image folder for transfer, the server stores the second selected image folder with the first image folder in the main folder. Similar to the examples described above, the user may delete or hide certain image folders in the main folder and/or the user may close the main folder and reopen it at a later time for additional image folder transfer. Further, in at least one embodiment, the main folder may allow a user to transfer both image folders and image files that are not previously stored in an image folder, to be stored together in the same main folder.

As can be appreciated from the preceding description, embodiments of the invention allow a user to organize electronic images in a convenient manner. Moreover, the invention is not limited to organization of data for still images. Although the above description and FIGS. 4-20 use still images as examples, the invention is equally applicable to video clips and audio clips. In the cases of video clips, the thumbnail images could be of the first frame of the clip. Upon selecting a video thumbnail, the video clip is played in an enlarged view, and the corresponding video file moved to an album. By viewing the next video clip without returning to the thumbnail interface, the corresponding file for the next clip is also moved to an album. In an alternative embodiment, audio or video file playlists may be automatically generated by the method and system of the invention. Other aspects of the embodiments described above are similarly applicable. Alternatively (and in the case of audio clips), the user can be presented with a display of icons or a simple list of file names as the "thumbnail" interface. Selecting a file name or icon would then cause the corresponding image, video or audio file to be enlarged (or played) and to be moved to an album, with other features of the previously-described embodiments being similarly applied.

As described above, FIG. 1 illustrates an embodiment in which the data files are stored in a portable personal server 114. In another embodiment the data files may be stored in a network server, which may be a service by a service provider. A user may access the server and present, edit, or manipulate the data files by using her mobile communication device (or a wireline communication device like a PC computer) as described herein. The network server may receive the data files from the mobile communication device (or from PC computer) of the user or from any other source, such as a photo service provider, or a music or video service provider. The user may access the server and service by her mobile communication device through a wireless network, such as wireless telecom network, WLAN, and/or Bluetooth type system. Commands for presenting, manipulating, and editing the data files may be transmitted through the used network. The selected data files also may be retrieved for presentation through the used network if a used display is attached in the mobile communication device of the user. Alternatively, when the used display is separate from the mobile communication device of the user, such as a TV device, set-top box, or personal computer, the selected data files may be directed to the display device through a second communication network (wireless or wireline).

In another embodiment image folders may be used and handled similarly as image files. For example, when a list of image folder names is represented, the user may select one image folder for a thumbnail presentation. When selecting a folder, a new main folder is created for storing the selected folder and all image files in it. When selecting a second folder from the list, it also may be stored in the new main folder. If the content of the image folder fails to meet the approval of the user, she also may prevent the selected folder from being stored in the main folder.

Although specific examples of carrying out the invention have been described, those skilled in the art will appreciate that there are numerous variations and permutations of the above-described systems and methods that are contained within the spirit and scope of the invention as set forth in the appended claims. For example, the user interfaces and screen layouts described are only examples; other user interfaces and screen layouts are within the scope of the invention. In some embodiments, image (or audio or video) files are not deleted from the "New" folder when the user selects a thumbnail for enlargement or play. Instead, the file is copied to the album, and the original file remains in the "New" folder until deleted by user command, until expiration of a preset time period, until overwritten by new data, etc. Images need not be created with a mobile device capable of communication via long-range wireless transmission. Images could be created by a digital camera which must download images by USB or BLUETOOTH connection or by transfer to a removable medium, or by scanning a previously-created drawing, photograph or other document. As yet a further alternative, a machine-readable medium could have machine-executable instructions stored thereon such that, when the instructions are read and executed by an appropriate device (or devices), steps of a method according to the invention are performed. These and other modifications are within the scope of the invention as defined in the attached claims.

We claim:

1. A method comprising:
    (a) storing a plurality of data files in an original folder of a plurality of folders in a memory;
    (b) receiving a first user instruction to process a first data file of the plurality of data files stored in the original folder;
    (c) automatically creating a first folder different from the original folder within said memory in response to the first user instruction;
    (d) automatically storing the first data file in the first folder in response to the first user instruction;
    (e) automatically removing the first data file from the original folder upon storing the first data file in the first folder;
    (f) processing the first data file according to the first user instruction;
    (g) receiving a second user instruction to process a second data file subsequent to processing the first data file; and
    (h) automatically storing the second data file in the first folder in response to the second user instruction.

2. The method of claim 1, further comprising (i) processing the second data file according to the second user instruction.

3. The method of claim 1, wherein the first user instruction includes at least one of: selecting the first data file, activating the first data file, presenting the first data file, editing the first data file, listening to the first data file, watching the first data file, rotating the first data file, saving the first data file, deleting the first data file, hiding the first data file, enlarging the first data file, copying the first data file, moving the first data file, opening the first data file, and printing the first data file.

4. The method of claim 1, wherein the second user instruction includes at least one of: selecting the second data file, activating the second data file, presenting the second data file, editing the second data file, listening to the second data file, watching the second data file, rotating the second data file, saving the second data file, deleting the second data file, hiding the second data file, enlarging the second data file, copying the second data file, moving the second data file, opening the second data file, and printing the second data file.

5. The method of claim 1, further comprising (i) displaying a file selection user interface configured to present information about each of the plurality of data files.

6. The method of claim 5, further comprising (j) displaying a second file selection user interface configured to present information about each of the plurality of data files.

7. The method of claim 5, wherein creating the first folder includes automatically creating the first folder in response to at least one of: (i) displaying the file selection user interface and (b) receiving the first user instruction.

8. The method of claim 5, further comprising (j) redisplaying the file selection user interface after the step of storing the first data file, wherein receiving the second user instruction includes receiving a selection of the second data file from the redisplayed file selection user interface.

9. The method of claim 5, wherein:
    a server is configured to perform (a), (d) and (h), the file selection user interface is displayed on a mobile device capable of wireless communication with the server, and selection of the first data file from said interface generates a presentation of the first data file on the mobile device.

10. The method of claim 9, wherein the mobile device is in communication with the server via at least one of: a short-range wireless connection, a wireless network connection and a wired connection.

11. The method of claim 5, wherein:
a server is configured to perform (a), (d) and (h),
the file selection user interface is displayed on a device capable of communication with the server, and
selection of the first data file from said interface generates a presentation of the first data file on the device.

12. The method of claim 10, wherein the server is a network server.

13. The method of claim 11, wherein the server is portable.

14. The method of claim 11, wherein the device is a mobile communication device.

15. The method of step 1, further comprising:
(i) receiving a signal to discontinue storage of data files in the first folder;
(j) creating a second folder in response to the signal to discontinue storage of data files in the first folder; and
(k) storing a next selected data file in the second folder.

16. The method of claim 15, wherein the signal to discontinue storage includes a signal to display a file selection user interface.

17. The method of claim 1, wherein processing the data file includes at least one of: an audio playback and a visual display of the contents of the first data file.

18. The method of claim 1, wherein the first data file and the second data file are selected from a same folder of the plurality of folders.

19. The method of claim 1, wherein the first data file and the second data file are selected from different folders of the plurality of folders.

20. The method of claim 1, wherein the first user instruction includes selecting the first data file and the second user instruction includes selecting the second data file.

21. The method of claim 1, wherein the plurality of data files are created at a mobile device communicating data files over a wireless communication network to a server configured to perform the method comprising (a) through (h).

22. The method of claim 1, wherein the plurality of data files are received at a server configured to perform the method comprising (a) through (h) from a portable device.

23. The method of claim 22, wherein the portable device is one of: a digital camera, a digital video recorder, an audio player/recorder, a mobile communication device, a camera phone, a cellular phone and a personal digital assistant.

24. The method of claim 22, wherein the server is portable.

25. The method of claim 22, wherein the server is a network server.

26. The method of claim 22, wherein the first and second user instructions are communicated from the portable device to the server.

27. The method of claim 22, wherein the server is configured to communicate presentations of the first and second data files to one of: a television display, a computer monitor and a video projector.

28. The method of claim 22, wherein the server is configured to communicate presentations of the first and second data files to the portable device.

29. The method of claim 1, wherein the plurality of data files is stored in a server configured to perform the method comprising (a) through (h).

30. The method of claim 29, wherein the server is one of: a set-top box, a personal video recorder and a personal computer.

31. The method of claim 29, wherein the server is portable.

32. The method of claim 31, wherein the server is one of: a digital camera; a digital video recorder, an audio player/recorder, a mobile communication device, a camera phone, a cellular phone and a personal digital assistant.

33. The method of claim 29, wherein the server is a network server.

34. The method of claim 1, wherein the plurality of data files is stored in a portable device configured to perform the method comprising (a) through (h).

35. The method of claim 1, further comprising (i) naming the first folder.

36. The method of claim 35, further comprising (j) automatically generating a prompt for user entry of a name for the first folder.

37. The method of claim 35, further comprising (j) automatically generating a name for the first folder based on metadata information associated with the first data file.

38. The method of claim 1, wherein the plurality of data files includes a plurality of data folders, the data folders configured to store data files and data folders.

39. A method for organizing data files, comprising:
(a) storing a plurality of data files in at least one of a plurality of folders in a memory;
(b) receiving a first user instruction to process a first data file;
(c) creating a first folder within said memory;
(d) storing the first data file in the first folder in response to the first user instruction;
(e) processing the first data file according to the first user instruction;
(f) receiving a second user instruction to process a second data file;
(g) storing the second data file in the first folder in response to the second user instruction; and
(h) displaying a file selection user interface configured to present information about each of the plurality of data files, wherein the plurality of data files are electronic image files, the file selection user interface includes a display of thumbnail images corresponding to the plurality of data files, and processing the first data file includes displaying an enlarged image corresponding to the first data file.

40. An apparatus comprising:
a processor; and
memory configured to store computer readable instructions that, when executed, cause the processor to perform a method comprising:
storing a plurality of data files in an original folder of a plurality of folders in the memory;
receiving a first user instruction to process a first data file of the plurality of data files stored in the original folder;
automatically creating a first folder different from the original folder within said memory in response to the first user instruction;
automatically storing the first data file in the first folder in response to the first user instruction;
automatically removing the first data file from the original folder upon storing the first data file in the first folder;
processing the first data file according to the first user instruction;
receiving a second user instruction to process a second data file subsequent to processing the first data file; and automatically storing the second data file in the first folder in response to the second user instruction.

41. The apparatus of claim 40, wherein the method further comprises displaying a file selection user interface configured to present a thumbnail view of each of the plurality of data files prior to receiving the first user instruction.

42. The apparatus of claim 41, wherein the plurality of data files are electronic image files, the file selection user interface includes a display of thumbnail images corresponding to the plurality of data files, and the first user instruction corresponds to a command to display an enlarged image corresponding to the first data file.

43. The apparatus of claim 41, the method further comprising:
 redisplaying the file selection user interface after processing the first data file; and
 determining whether the second user instruction was received after the first user instruction and prior to redisplaying the file selection user interface.

44. The apparatus of claim 43, the method further comprising, in response to determining that the second user instruction was received after the first user instruction but after redisplaying the file selection user interface:
 automatically creating a second folder, different from the first folder, in response to the second user instruction; and
 automatically storing the second data file in the second folder.

45. The apparatus of claim 43, wherein the second data file is automatically stored in the first folder in response to the second user instruction only upon determining that the second user instruction was received after the first user instruction and prior to redisplaying the file selection user interface.

46. One or more computer readable media storing computer readable instructions that, when executed, cause a processor to perform a method comprising:
 storing a plurality of data files in an original folder of a plurality of folders in a memory;
 receiving a first user instruction to process a first data file of the plurality of data files stored in the original folder;
 automatically creating a first folder different from the original folder within said memory in response to the first user instruction;
 automatically storing the first data file in the first folder in response to the first user instruction;
 automatically removing the first data file from the original folder upon storing the first data file in the first folder;
 processing the first data file according to the first user instruction;
 receiving a second user instruction to process a second data file subsequent to processing the first data file; and
 automatically storing the second data file in the first folder in response to the second user instruction.

47. The one or more computer readable media of claim 46, further comprising instructions for displaying, prior to receiving the first user instruction, a selection interface configured to present a thumbnail view of each of the plurality of data files.

48. The one or more computer readable media of claim 47, wherein the first instruction includes a command to enlarge a thumbnail corresponding to the first data file.

49. The one or more computer readable media of claim 47, further comprising instructions for:
 redisplaying the selection interface after processing the first data file; and
 determining whether the second user instruction was received after the first user instruction and prior to redisplaying the selection interface.

50. The one or more computer readable media of claim 49, further comprising instructions for:
 automatically creating a second folder different from the first folder in response to determining that the second user instruction was received after redisplaying the selection interface; and
 storing the second data file in the second folder.

* * * * *

UNITED STATES PATENT AND TRADEMARK OFFICE
CERTIFICATE OF CORRECTION

PATENT NO. : 7,464,110 B2 Page 1 of 1
APPLICATION NO. : 10/879161
DATED : December 9, 2008
INVENTOR(S) : Seppo Pyhälammi et al.

It is certified that error appears in the above-identified patent and that said Letters Patent is hereby corrected as shown below:

On the Title Page, Item [75] Inventors:
Please delete "Kai Häggman, Espoo (FI)" and insert --Kaj Häggman, Espoo (FI)--

Signed and Sealed this

Eighteenth Day of August, 2009

David J. Kappos
*Director of the United States Patent and Trademark Office*